US007489846B2

(12) United States Patent
Grot et al.

(10) Patent No.: US 7,489,846 B2
(45) Date of Patent: Feb. 10, 2009

(54) PHOTONIC CRYSTAL SENSORS

(75) Inventors: Annette Grot, Cupertino, CA (US);
Kai-Cheung Chow, San Jose, CA (US);
Laura Wills Mirkarimi, Sunol, CA
(US); Mihail M. Sigalas, Santa Clara,
CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 447 days.

(21) Appl. No.: 10/799,020

(22) Filed: Mar. 11, 2004

(65) Prior Publication Data

US 2005/0200942 A1    Sep. 15, 2005

(51) Int. Cl.
*G02B 6/17* (2006.01)
(52) U.S. Cl. ............... 385/123; 385/129; 385/125; 385/132
(58) Field of Classification Search ............... 385/123, 385/129, 125, 132; 359/245, 321, 332, 322
See application file for complete search history.

(56) References Cited

U.S. PATENT DOCUMENTS

| | | | | |
|---|---|---|---|---|
| 6,160,944 | A * | 12/2000 | Payne et al. | 385/129 |
| 6,661,938 | B2 | 12/2003 | Lim et al. | |
| 6,697,542 | B2 * | 2/2004 | Platzman et al. | 385/5 |
| 6,870,970 | B2 * | 3/2005 | Leonard et al. | 385/122 |
| 6,937,781 | B2 * | 8/2005 | Shirane et al. | 385/16 |
| 2002/0146196 | A1 * | 10/2002 | Shirane et al. | 385/16 |
| 2003/0107799 | A1 * | 6/2003 | Poberezhskiy et al. | 359/332 |
| 2004/0027646 | A1 * | 2/2004 | Miller et al. | 359/322 |
| 2004/0033009 | A1 * | 2/2004 | Soljacic et al. | 385/16 |
| 2004/0062505 | A1 * | 4/2004 | Sugitatsu et al. | 385/131 |
| 2004/0258383 | A1 * | 12/2004 | Sato et al. | 385/129 |
| 2005/0175304 | A1 * | 8/2005 | Romagnoli et al. | 385/129 |

OTHER PUBLICATIONS

Painter O. et al., "Defect Modes of a Two-Dimensional Photonic Crystal in an Optically Thin Dielectric Slab", J. Opt. Soc. Am B, vol. 16, No. 2, Feb. 1999, pp. 275-285.
Subramania, G. et al., "Tuning the Microcavity Resonant Wavelength in a Two-Dimensional Photonic Crystal by Modifying the Cavity Geometry", Applied Physics Letters, vol. 83, No. 22, Dec. 1, 2003, pp. 4491-4493.
Loncar, Marko et al., "Photonic Crystal Laser Sources for Chemical Detection", Applied Physics Letters, vol. 82, No. 26, pp. 4648-4650.
Vos, William et al., "Photonic Crystals: Making a Cage for Light".
Villa, F. et al., "Photonic Crystal Sensor based on Surface Waves for Thin Film Characterization", Optics Letters, vol. 27, No. 8, Apr. 15, 2002, pp. 646-648.
Kramper, P. et al. "Direct Spectroscopy of a Deep Two-Dimensional Photonic Crystal Microresonator", Physical Review B, vol. 64, 233102, pp. 1-4.
Schilling J.et al., "A Model System for Two-Dimensional and Three-Dimensional Photonic Crystals: Macroporous Silicon", Pure and Applied Optics, S121-S-132.

(Continued)

*Primary Examiner*—James P Hughes

(57) ABSTRACT

Photonic crystal sensors may be created from two and three dimensional photonic crystals by introducing defects. The localization of the optical field in the defect region affords the ability to sense small volumes of analyte.

24 Claims, 18 Drawing Sheets

OTHER PUBLICATIONS

Birner A. et al., "Transmission of a Microcavity Structure in a Two-Dimensional Photonic Crystal based on Macroporous Silicon", Materials Science in Semiconductor Processing, 2000, pp. 487-491.

Foresi J. S. et al., "Photonic-Bandgap Microcavities in Optical Waveguides", Letters to Nature, Nov. 13, 1997, pp. 143-145.

* cited by examiner

PHOTONIC CRYSTAL SENSORS

BACKGROUND

Thin film sensors based on optical measurements typically measure the average thin film thickness over a given area. Two common optical approaches for the measurement of thin film thickness are based on ellipsometry and surface plasmon resonance. Other optical approaches are based on interferometry using two waveguide branches. An example of a non-optical thin film sensor is a quartz resonator where the film thickness is determined by measuring the change in mechanical resonance. Applications for the measurement of thin film thickness include the monitoring of fabrication processes and kinetic antigen-antibody experiments where the rate of deposition or adsorption is important. For typical optical sensor approaches, good sensitivity is achieved by measuring the angle of incident or reflected light with high precision. Typically, precise angle measurement in Surface Plasmon Resonance (SPR) requires either a large measurement area or large distances between the sample and the detector or both. To measure a very thin film it is typically necessary for the optical field to be tightly confined in the vertical dimension where the vertical dimension corresponds to the film thickness direction.

SUMMARY OF THE INVENTION

In accordance with the invention, photonic crystal sensors may be made from two or three dimensional photonic crystal lattices by introduction of a lattice defect. Photonic crystal sensors may be used to measure thin film thicknesses with measurement areas that may be less than 1 $\mu m^2$. The photonic crystal sensor is typically coated with a thin conformal film whose thickness is to be measured. Optical fields are typically confined to a radius less than about 600 nm in photonic crystal sensors made from two dimensional photonic crystal lattices to reduce sensitivity to refractive index variations not due to changes in the thickness of the thin film to be measured. Photonic crystal sensors made from two dimensional photonic crystals may be arranged in arrays to allow the rapid interrogation of a large number of samples.

DETAILED DESCRIPTION OF THE INVENTION

Photonic crystal structures allow optical fields to be tightly confined to volumes less than about 1 $\mu m^3$. Photonic crystal structures are materials patterned with a periodicity in dielectric constant which can create a range of forbidden frequencies or wavelengths called a photonic bandgap. Photons with energies lying in the bandgap cannot propagate through the material. A photonic crystal sensor can be created in a two or three dimensional photonic crystal lattice by introducing a defect into the photonic crystal lattice structure. The term "photonic crystal sensor" for the purposes of this patent application is defined to be an optical sensor that uses a photonic crystal to localize the optical field or light in a volume having an average dielectric susceptibility lower than that of the surrounding material. Such a volume is the defect hole in a two dimensional photonic crystal sensor, for example (see FIG. 1). Photonic crystal sensors as defined in this application are distinguished from optical micro-cavity sensors (e.g. see U.S. Pat. No. 6,661,938, col. 3, lines 26-38). For optical micro-cavity sensors, increases in sensitivity require increases in the Q factor. As explained below, this is not the case for photonic crystal sensors.

A two dimensional photonic crystal lattice in accordance with the invention may be constructed by etching holes of the same radius into a high index material slab made from, for example, Si or InP where the defect is a hole having a different radius from the rest of the holes. Optical confinement in the third dimension is provided by using low index cladding layers, typically oxide films such as $SiO_2$ or air, above and below the high index slab. To create wide photonic gaps, the radius of the holes is typically in the range from about 0.2a to 0.4a where a is the lattice constant. Lattice structures having hexagonal symmetry typically produce the largest bandgap.

In accordance with the invention, a three dimensional photonic crystal lattice may be constructed from layers of dielectric rods having a high refractive index. Optical confinement is then provided by photonic bandgaps in all three dimensions.

Figure 1:
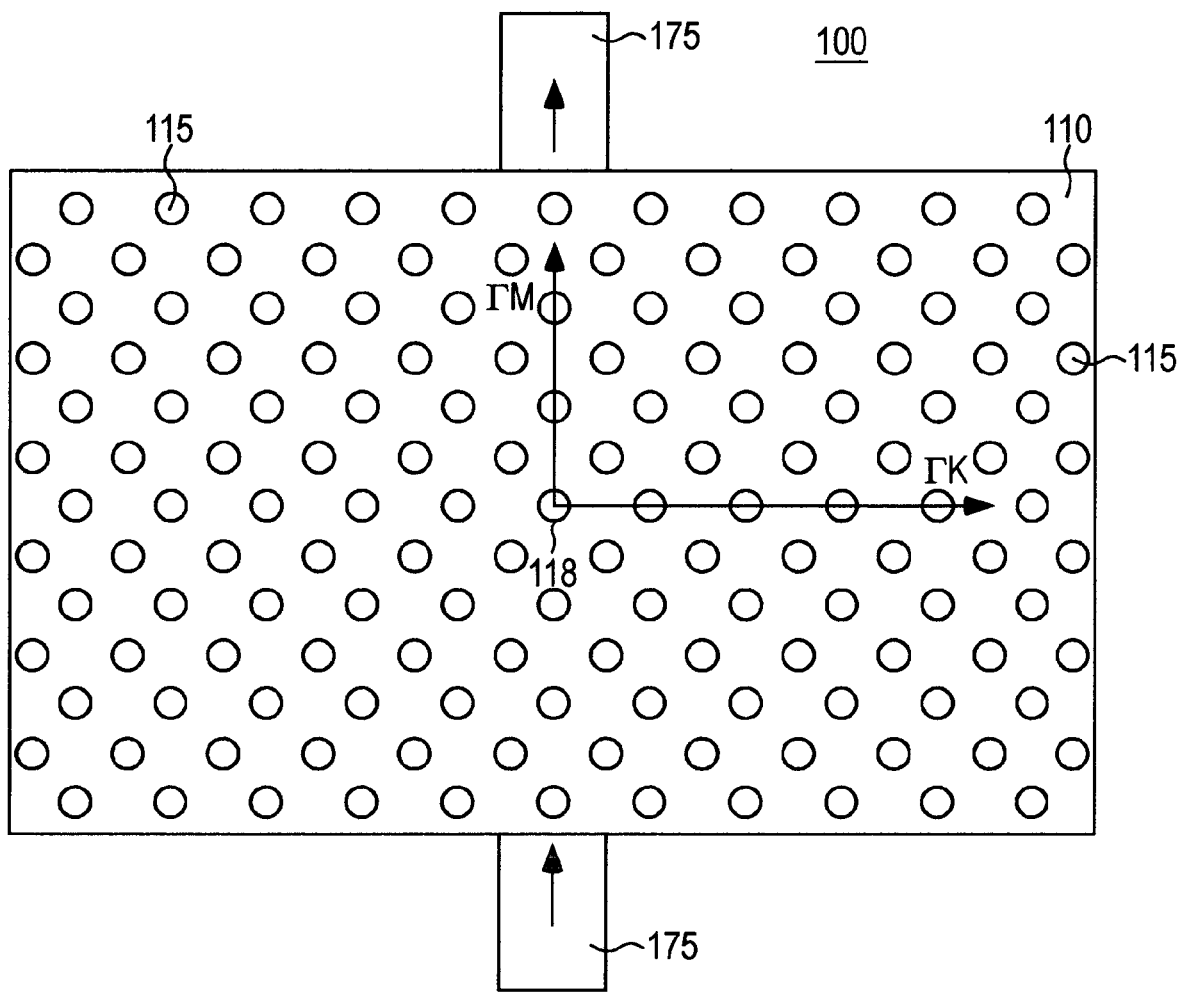
FIG. 1 shows an embodiment in accordance with the invention.

In an embodiment in accordance with the invention, with reference to FIG. 1, photonic crystal sensor 100 may be constructed using two dimensional photonic crystal lattice structure 110. Photonic crystal lattice structure 110 can be constructed to have a bandgap between about 1300 nm and 1600 nm by etching holes 115 with a diameter of about 255 nm (0.58a) on a triangular lattice having a lattice constant a of about 440 nm in a Si slab material about 260 nm (0.59a) thick. Reducing the diameter of defect hole 118 from about 255 nm (0.58a) to about 176 nm (0.40a) results in photonic crystal sensor 100.

If holes 115 and defect hole 118 are filled with air at a refractive index of about 1.00, the operating wavelength is about 1350 nm. The "operating wavelength" or "operating frequency" for the purposes of this patent application is defined to be the wavelength or frequency at which the optical field or light is localized. If photonic crystal sensor 100 is coated with a thin conformal film typically having a refractive index of about 1.5 and thickness of about 10 nm, the average index of refraction inside holes 115 and defect hole 118 is typically increased to shift the operating wavelength to about 1360 nm. Most typical thin films of interest are conformal. Conformality can be encouraged for water based solution analysis by insuring the surface of photonic crystal sensor 100 is hydrophilic. For protein analysis, a polyelectrolyte thin film deposition technique may be used to prepare a continuous, conformal coating of poly-d-lysine which enhances the bonding of proteins to the surface. However, the thin film need not be conformal as long as film material enters holes 115 and defect hole 118. Typically, the shift in operating wavelength depends on the radii of holes 115 and the radius of defect hole 118. Software packages such as MIT Photonic Bands (MPB) package available from the Massachusetts Institute of Technology may be used to predict the operating wavelength. Note that all holes 115 and defect hole 118 have a depth corresponding to the thickness of the slab material, in this example, about 260 nm.

In accordance with an embodiment of the invention, two conventional ridge waveguides 175 about 0.75 mm long are used to couple light in and out of photonic crystal sensor 100 and are attached to photonic crystal lattice structure 110 in a direction perpendicular to the direction typically used for waveguide propagation in photonic crystal lattice structure 110. Conventional ridge waveguides 175 are tapered down from a about 2 μm width to a width of about 1.4a which is about 0.6 μm to match the mode profile as shown in FIG. 1. The external facets of conventional ridge waveguides 175 are typically antireflection coated with a pair of $TiO_2$ and $SiO_2$ layers to suppress the Fabry-Perot resonance. The use of antireflection coating may be avoided by using a waveguide taper to expand the optical mode into a low-refractive index (typically about 1.5) waveguide that does not have high reflectivity at the air interface. The two distinct directions on photonic crystal lattice structure 110 are the nearest neighbor direction (ΓK) and the second nearest neighbor direction (ΓM). Between conventional ridge waveguides 175, photonic crystal sensor 100 typically has six layers of photonic crystal along the ΓM direction and typically eleven to twelve layers along the perpendicular ΓK direction. In accordance with an embodiment of the invention, light is coupled into photonic crystal sensor 100 along the ΓM direction because the coupling efficiency along the ΓM direction is typically at least a factor four higher than the ΓK direction. The difference in coupling efficiency arises because the in-plane leakage from the finite size effect in these kinds of dipole modes lies mainly along the ΓM direction.

The transmission spectrum is typically measured using a tunable narrowband optical source coupled to photonic crystal lattice structure 110 using free space or waveguide optics. For example, a tunable TE polarized laser beam may be focused into conventional ridge waveguide 175 using, for example, a microscope objective lens. Conventional ridge waveguide 175 has a numerical aperture (NA) or acceptance angle associated with it. As long as the NA of the converging laser beam coming from the microscope objective lens is less than the NA of conventional ridge waveguide 175, the light is coupled into conventional ridge waveguide 175. The NA of conventional ridge waveguide 175 is related to the refractive index difference between the waveguide core, $n_1$ and the waveguide cladding, $n_2$: $NA=(n_1^2-n_2^2)^{1/2}$. The larger the refractive index of the waveguide core compared to the refractive index of the waveguide cladding, the greater NA or acceptance angle.

Figure 2A:
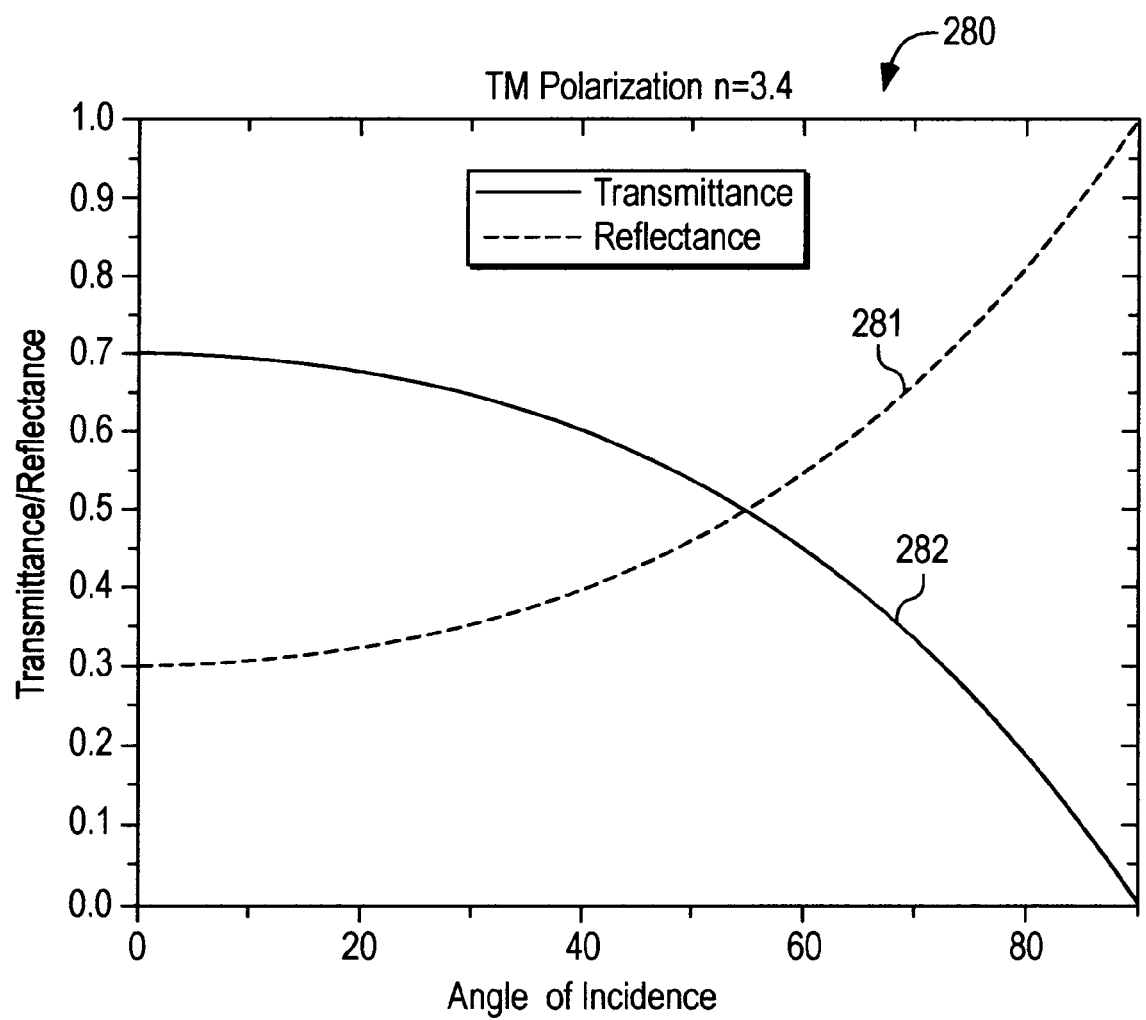
FIG. 2a shows transmittance/reflectance for TM polarization as a function of the angle of incidence.
Figure 2B:
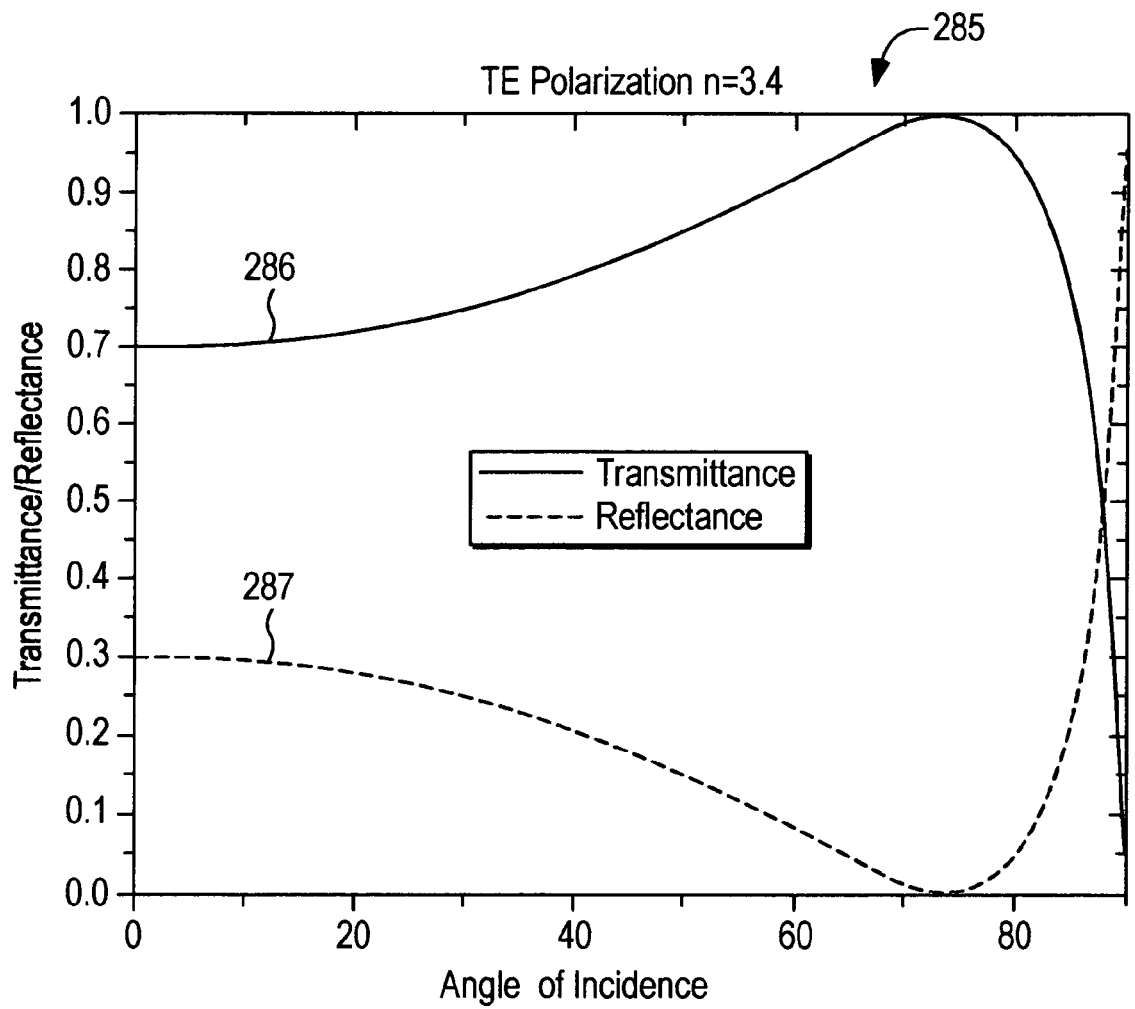
FIG. 2b shows transmittance/reflectance for TE polarization as a function of the angle of incidence.

For example, if $n_1 \sim 3.4$ and $n_2 \sim 1.5$, the acceptance angle is effectively 90 degrees and the reflectance/transmittance as a function of angle of incidence needs to be considered. FIG. 2a shows graph 280 where curve 281 shows the reflectance as a function of the angle of incidence while curve 282 shows the transmittance as a function of the angle of incidence for a TM polarized wave. FIG. 2b shows graph 285 where curve 287 shows the reflectance as a function of the angle of incidence while curve 286 shows the transmittance as a function of the angle of incidence for a TE polarized wave. All wave polarizations may be represented as a linear combination of TE and TM polarizations. For photonic crystal sensor 100 only the TE polarized wave has the photonic bandgap.

A spectrometer or monochromator illuminated by a broadband optical source may also be used to measure the transmission spectrum. Transmitted power exiting conventional ridge waveguide 175 is typically measured using a calibrated InGaAs detector or other suitable photodetector (not shown). An infrared camera may be used as a diagnostic to monitor the mode profile of the transmitted light to ensure that only the signal from the waveguide mode enters the photodetector. When the optical wavelength of the narrowband optical source matches the operating wavelength of photonic crystal sensor 100, maximum optical power is transmitted through photonic crystal sensor 100. Curve fitting can be employed to improve the sensitivity to determine the operating frequency or wavelength of photonic crystal sensor 100.

Figure 2C:
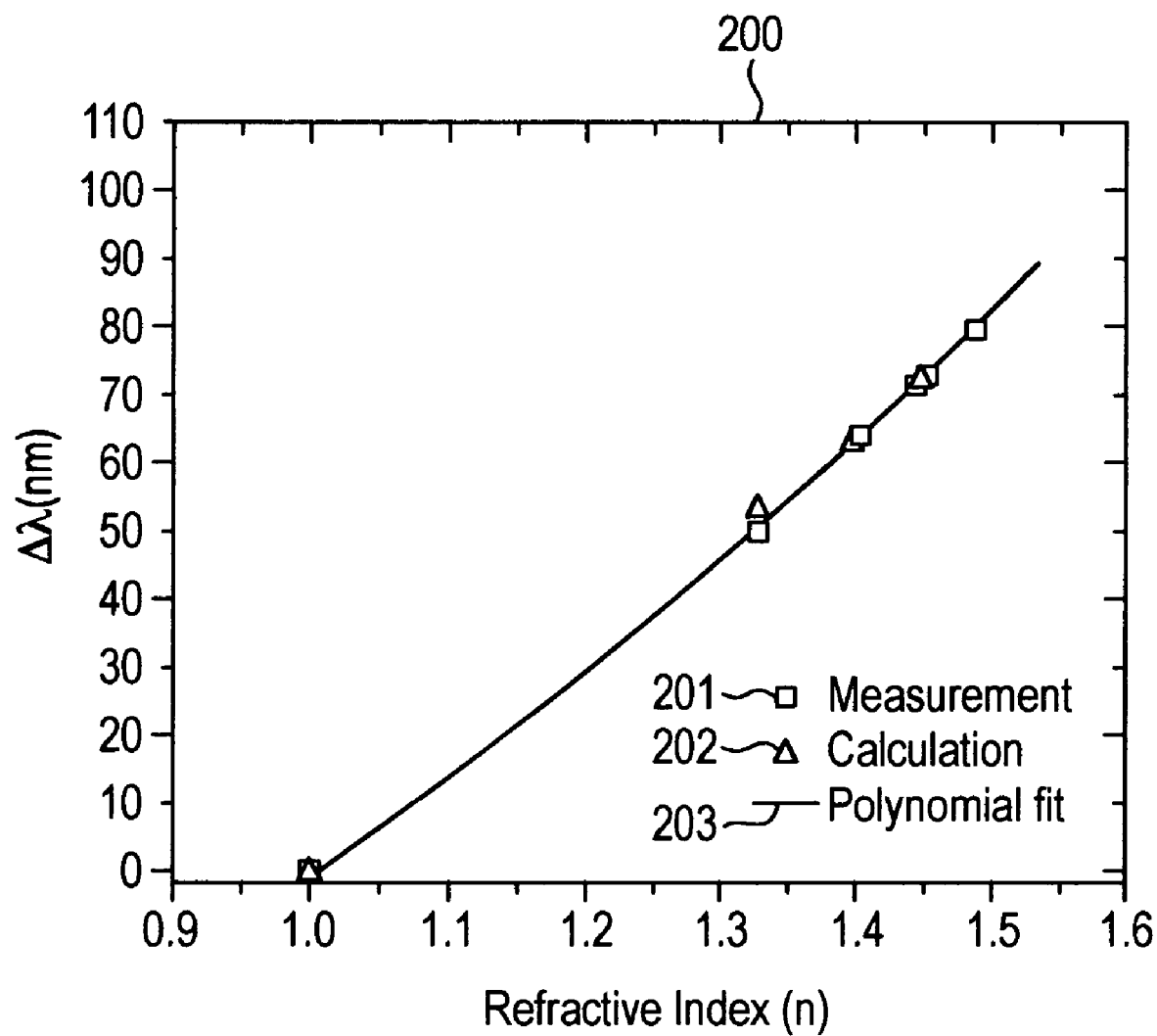
FIG. 2c shows the shift in wavelength as a function of refractive index for an embodiment in accordance with the invention.
Figure 2D:
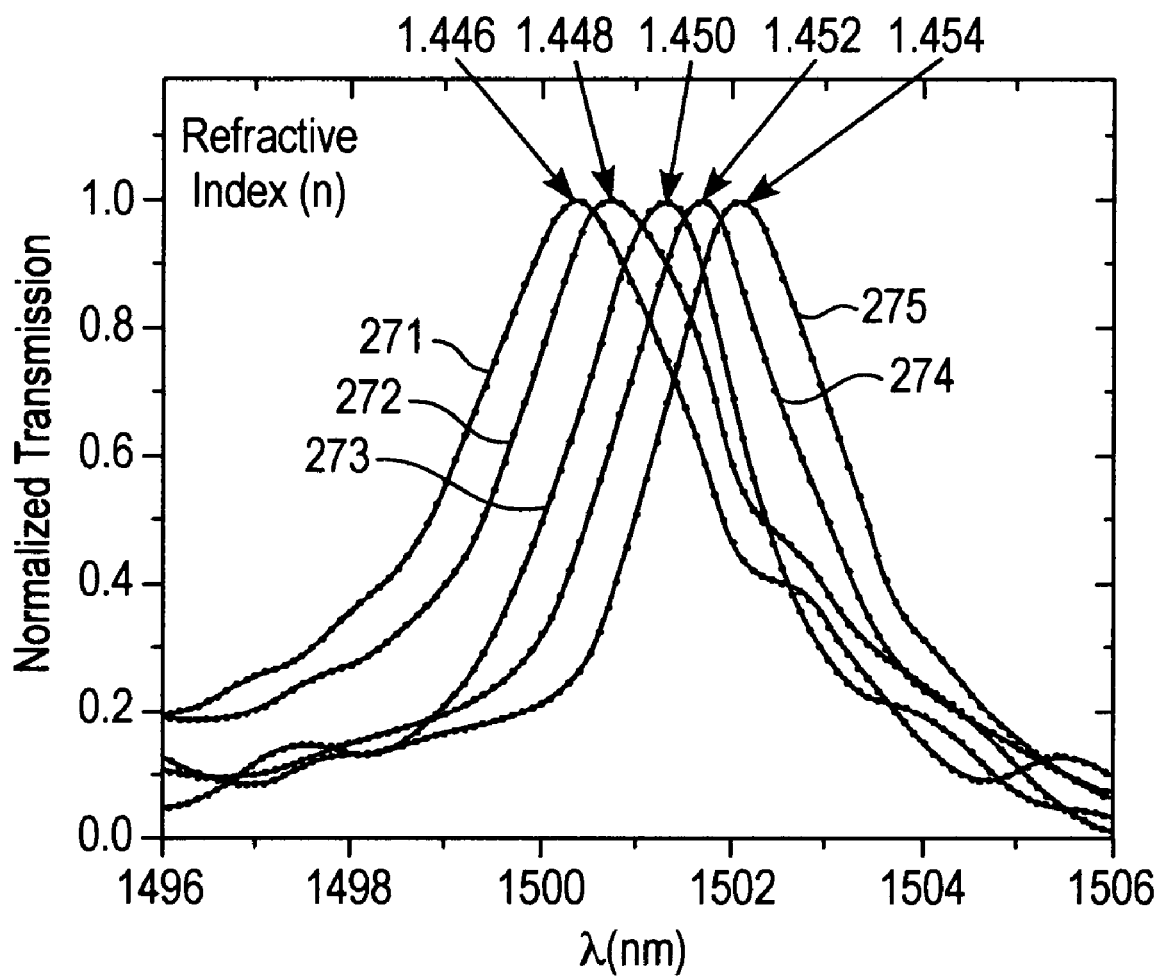
FIG. 2d shows normalized transmission spectra as a function of wavelength for an embodiment in accordance with the invention.
Figure 2E:
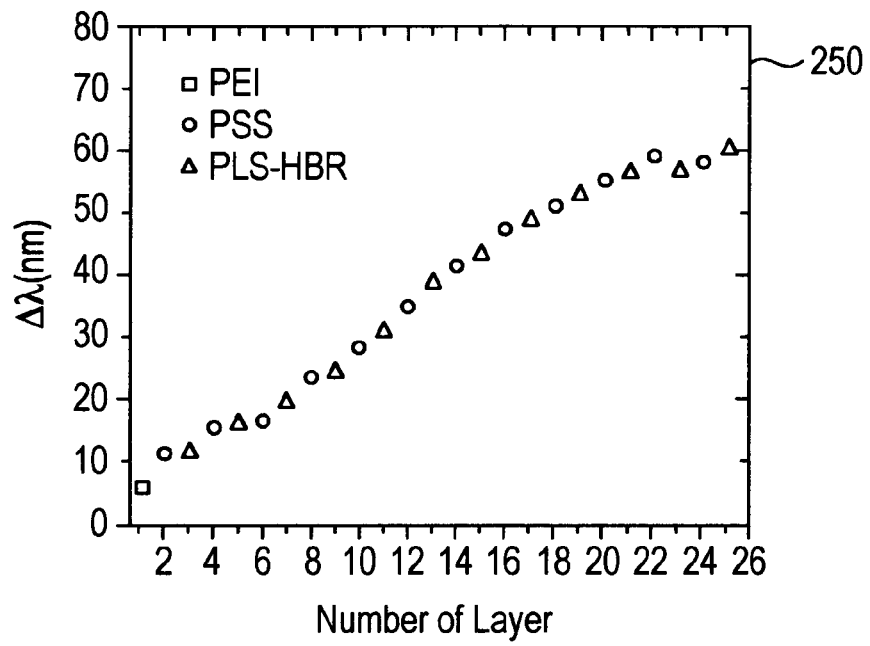
FIG. 2e shows the shift in operating wavelength $\Delta\lambda$ as a function of film thickness for an embodiment in accordance with the invention.
Figure 2F:
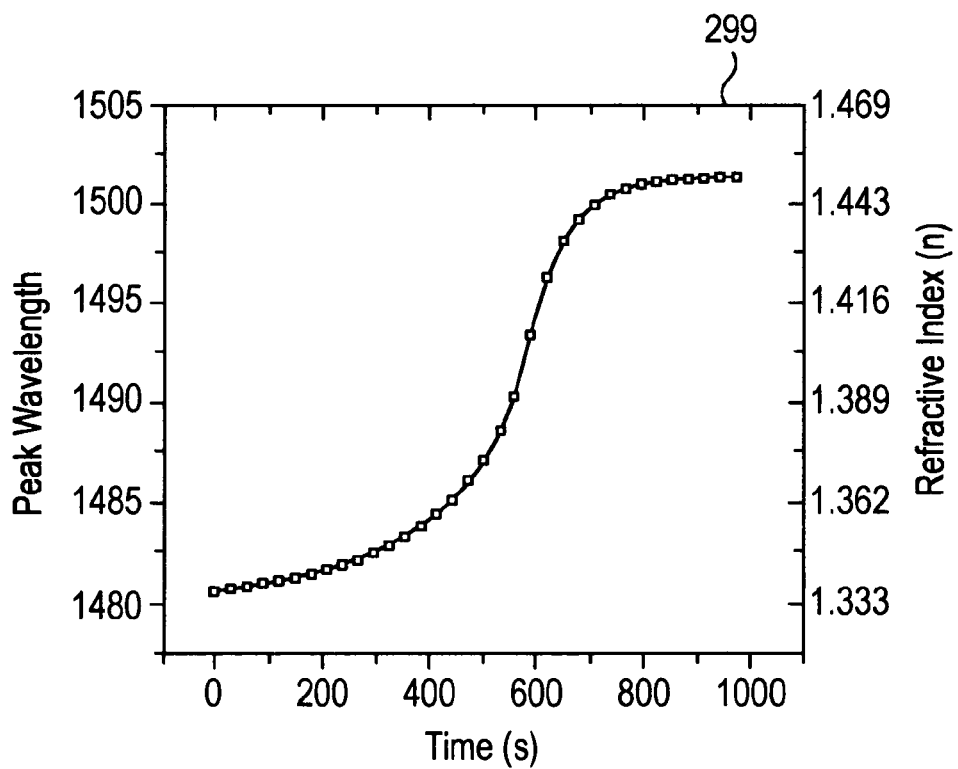
FIG. 2f shows the change in the operating wavelength/refractive index as a function of time for an embodiment in accordance with the invention.
Figure 2G:
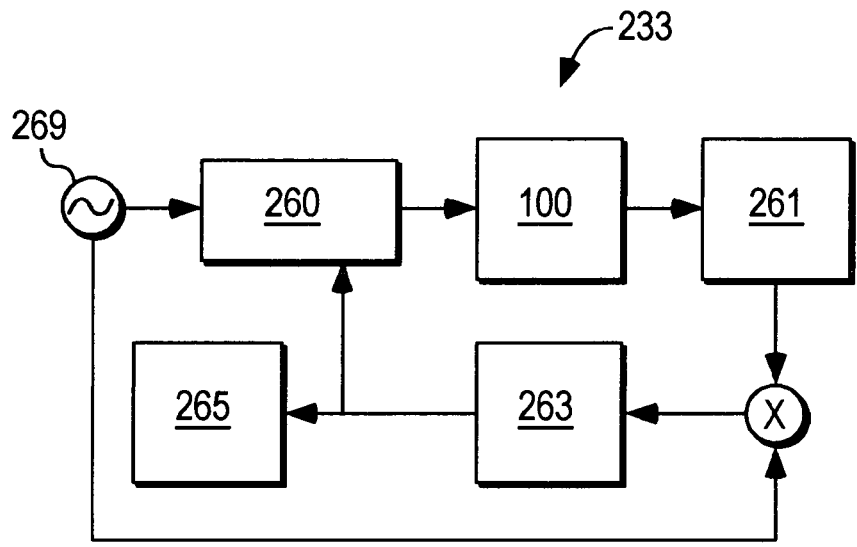
FIG. 2g shows a dither system in an embodiment in accordance with the invention.

In accordance with an embodiment of the invention with reference to FIG. 2g, in dither system 233, narrowband optical source 260 is optically coupled to photonic crystal sensor 100. The optical frequency of narrowband optical source 260 may be modulated by applying a slowly varying sinusoidal signal from signal generator 269 and causing the optical frequency or wavelength to slowly vary (sometimes referred to as "dithering"). Narrowband optical light source 260 is typically selected to be a semiconductor laser which may be modulated by applying a small modulation to the injection current. When the optical frequency or wavelength of narrowband optical light source 260 is close to the center frequency or wavelength of the operating wavelength or frequency, the voltage from photodetector 261 in response to the slowly varying optical frequency or wavelength is also modulated. The amplitude of the voltage from photodetector 261 is related to how far from the operating frequency or wavelength the slowly varying optical frequency or wavelength is. Typically, a device such as lock-in amplifier 263, for example, may be used to produce an error signal that goes to narrowband optical light source 260 and processor 265. The error signal allows locking to the peak of the operating frequency using a feedback loop because the amplitude of the dither signal on photodetector 261 is a minimum when the optical frequency of narrowband optical source 260 is at the operating frequency or wavelength of photonic crystal sensor 100. Hence, the operating frequency or wavelength of photonic crystal sensor 100 may be determined in processor 265.

Figure 2H:
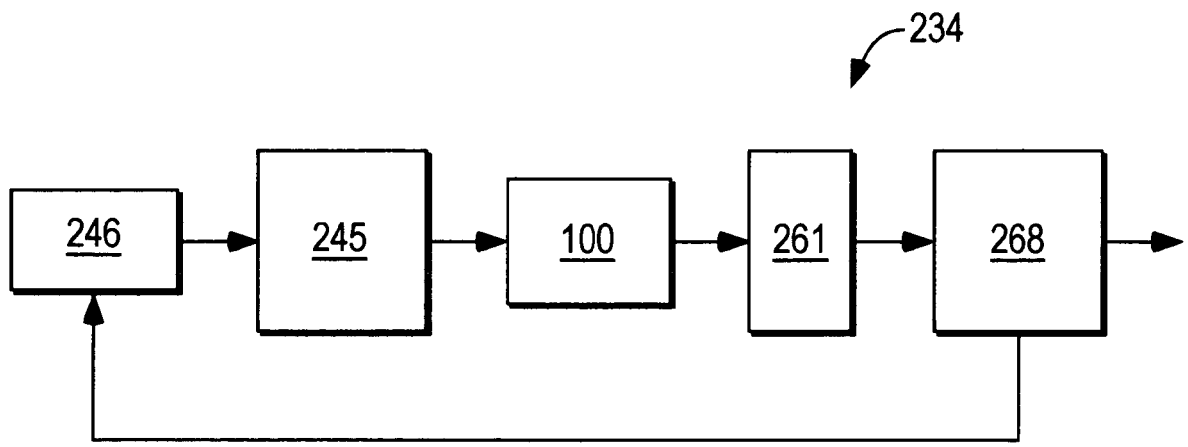
FIG. 2h shows a synchronized scanning system in an embodiment in accordance with the invention.

In accordance with an embodiment of the invention with reference to FIG. 2h, synchronized scanning system 234 may be used to determine the operating frequency or wavelength. By measuring the photocurrent from photodetector 261 as a function of time and synchronizing to time varying tunable narrowband optical source 245 such as tunable laser, the operating frequency or wavelength can be encoded as a time delay, δ. For example, if the tunable narrowband optical source 245 coupled to photonic crystal sensor 100 is uniformly tuned by to scan from 1490 nm to 1510 nm in about 20 msec and a pulse is delivered by clock 246 to peak capture circuit 268 at the beginning of the scan, determination of when in time the peak current occurs allows determination of the operating frequency or wavelength. If, for example, the peak current occurs 10 msec after the pulse indicating the start of the wavelength scan is delivered to the peak capture circuit 268, the operating wavelength is at 1500 nm.

Figure 2I:
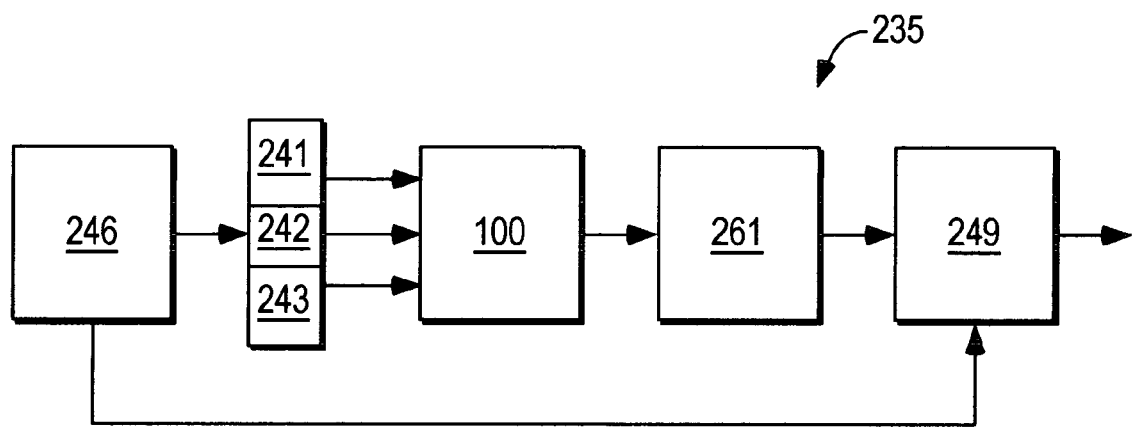
FIG. 2i shows a wide-band multiple element non-tunable source system in an embodiment in accordance with the invention.

In accordance with an embodiment of the invention with reference to FIG. 2i, wide-band multiple element non-tunable source system 235 uses relatively broad non-tunable optical sources such as light emitting diodes (LEDs) may be used at comparatively low cost. For example, three LEDs 241, 242, 243 each having a full width half maximum (FWHM) spectral width of about 40 nm centered at different wavelengths 1480 nm, 1500 nm and 1520 nm, respectively, may be used. Each of the LEDs 241, 242, 243 is turned on in sequence by clock 246 and optically coupled to photonic crystal sensor 100. Photodetector 261 measures the transmitted power from each LED 241, 242, 243 in sequence. The current generated by photodetector 261 is governed by the convolution of the LED's power distribution and the transmission curve for photonic crystal 100. The use of three LEDs 241, 242, 243 removes the wavelength or frequency ambiguity that is present when the operating wavelength or frequency is not matched to peak frequency of the optical source and increases the dynamic range of the system. The larger the frequency spread of the optical source the more operating frequencies may be addressed which allows a wider range of film thicknesses up to the size of defect hole 118. If the FWHM of the LEDs is about 40 nm and the FWHM of the sensor spectral profile is about 2 nm, adequate wavelength discrimination is obtained.

Figure 2J:
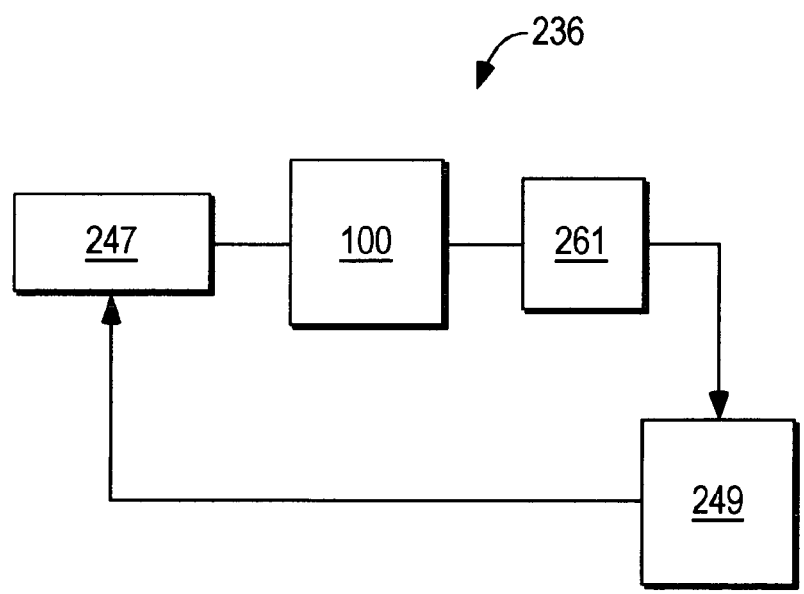
FIG. 2j shows slope based peak detection system in an embodiment in accordance with the invention.

In accordance with an embodiment of the invention with reference to FIG. 2j, slope based peak detection system 236 uses tunable narrowband optical source 247 optically coupled to photonic crystal sensor 100 is used where the frequency or wavelength of tunable narrowband optical source 247 switches at a frequency $f_0$ between two optical wavelengths. The difference between the two optical wavelengths is kept constant by the electronics in tunable narrowband optical source 247 and tunable narrowband optical source 247 is operating in "dither" mode. Photodetector 261 measures the relative power transmitted at the two different wavelengths and an error signal from bandpass filter 249 centered at $f_0$ tunes the lower frequency or wavelength such that the current from photodetector 261 is equal for both wavelengths. The operating wavelength is then at the midpoint between the lower and upper wavelength.

A droplet of calibrated commercial silicone fluid is applied by syringe to the surface of photonic crystal sensor 100 typically resulting in a film thickness over the surface of photonic crystal sensor 100 on the order of a few hundred μm and an area coverage of about 5 mm². Because the volume of the silicone fluid on the surface of photonic crystal sensor 100 is several orders of magnitude larger than the sensing volume, the silicone fluid may be taken to be an infinite homogeneous background replacing the air. Photonic crystal sensor 100 is rinsed in acetone and isopropanol then dried before application of the next drop of silicone fluid having a different refractive index.

Graph 200 in FIG. 2c shows the shift in operating wavelength $\Delta\lambda=\lambda(n)-\lambda(air)$ as a function of ambient refractive index n in holes 115 and hole 118 for the embodiment in accordance with the invention shown in FIG. 1. Quadratic fit 203 is applied to both measured data 201 and calculated data 202. The close agreement between calculated data 202 and measured data 201 indicates that the silicone fluid has completely filled holes 115 and 118.

FIG. 2d shows normalized transmission spectra 271, 272, 273, 274, 275 obtained using five different indices of refraction from about n=1.446 to n=1.454, respectively, with increments Δn=0.002. The operating wavelength in FIG. 2d increases by about 0.4 nm for a refractive index increase of Δn=0.002. The transmission data are numerically smoothed to remove the Fabry-Perot oscillations due to residual reflectivity at the end facets of conventional ridge waveguides 175. The operating peak wavelength is determined by fitting data to a Lorentzian. Transmission spectra 271, 272, 273, 274, 275 were obtained by successive application of droplets of commercial silicone fluid to the surface of photonic crystal sensor 100. The commercial silicone fluids used have a calibrated refractive index accuracy of Δn=±0.0002 and refractive index increments of Δn=0.002.

Graph 250 in FIG. 2e shows the shift in operating wavelength Δλ as a function of film thickness for an embodiment in accordance with the invention. Graph 250 shows the operating wavelength shift using exemplary materials that are of similar refractive index to proteins and antibodies (refractive index n in the range from about 1.4 to 1.5). Layer by layer electrostatic assembly of electrically charged polymers is performed using, polyetheleneimine (PEI), polysodium 4-styrenesulfate (PSS) and poly (d-lysine hydrobromide) (PLS-HBR). The thin film layers are each typically in the range of 2-3 nm thick. The effective charge on PEI and PLS-HBR is positive while the effective charge on PSS is negative. PEI typically functions well as a surface preparation chemical because it readily attaches to an $SiO_2$ surface. PSS and PLS-HBR are weak electrolytes that deposit as smooth, uniform monolayers.

Photonic crystal sensor 100 may be used to measure the thickness of thin films where the film thickness is less than the radius of hole 118. Once defect hole 118 and holes 115 are filled, the operating wavelength or frequency will not shift because the optical field or light is confined within the plane of photonic crystal sensor 100. If defect hole 118 is filled prior to holes 115 a shift in operating wavelength or frequency still occurs. In typical operation, defect hole 118 is not completely filled.

Photonic crystal sensor 100 may also function to perform time resolved in-situ sensing. As an example, a droplet of 5 percent glycerol in deionized water having a volume on the order of the silicone fluid droplet discussed above is applied to the surface of photonic crystal sensor 100. Photonic crystal sensor 100 is then heated resulting in the evaporation of the deionized water. Graph 299 in FIG. 2f shows the change in the operating wavelength as a function of time where the right vertical axis shows the corresponding refractive index n obtained using the quadratic fit from FIG. 2a. As the deionized water evaporates, the operating wavelength shifts from about 1480.82 nm to about 1501.45 nm corresponding to a refractive index change from about n=1.338 to n=1.451. The initial and final refractive index correspond to 5 percent and 85 percent glycerol, respectively, in the glycerol deionized water mixture. The glycerol deionized water mixture reaches a steady state after about 900 seconds.

A source of noise for photonic crystal sensor 100 involves variations of temperature. For example, the refractive index of water depends on the water temperature. For temperatures in the range of about 20° C. to 50° C., the refractive index dependence for water on temperature is $dn/dT \approx 3 \cdot 10^{-4}$ at about 1500 nm. Hence, a 1° C. change in temperature results in a refractive index change of about $3 \cdot 10^{-4}$ and the change in operating frequency or wavelength for photonic crystal sensor 100 is about 0.06 nm.

Variations of photonic crystal sensor 100 in FIG. 1 may be constructed that have varying degrees of sensitivity. FIGS. 3a-e show variations of photonic crystal sensor 100 shown in FIG. 1. 300, 301, 302, 303, 304 use high refractive index slabs 320, 321, 322, 323, 324, respectively, having a refractive index n of about 3.4 corresponding to materials such as Si or GaAs and a thickness of about 0.6a where a is the lattice constant. Slabs 320, 321, 322, 323, 324 are each placed over a low refractive index material having a refractive index of about 1.4 corresponding to materials such as $SiO_2$. Five layers of holes 315, 316, 317, 318, 319 corresponding to slabs 320, 321, 322, 323, 324, respectively, are positioned along the propagation direction and used in photonic crystal sensors 300, 301, 302, 303, 304. Conventional ridge waveguides 375 having a width 1.4a are used to couple light into and out of photonic crystal sensors 300, 301, 302, 303, 304. Holes 315, 316, 317, 318, 319 are made in high refractive index slabs 320, 321, 322, 323, 324, respectively, on a triangular lattice with lattice constant a. Holes 315, 316, 317, 318, 319 are taken to be air filled or filled with a low index refractive material having a refractive index of about 1.4. The area above high refractive index slabs 320, 321, 322, 323, 324 is either air or a low refractive index material having a refractive index of about 1.4 The change in operating frequency $\Delta v$ for photnic crystal sensors 300, 301, 302, 303, 304 divided by the operating frequency in air $v_{air}$ provides a measure of the sensitivity of photonic crystal sensors 300, 301, 302, 303, 304. The greater $\Delta v/v_{air}$, the higher the sensitivity of the particular photonic crystal sensor resulting in a better sensor.

Figure 3A:
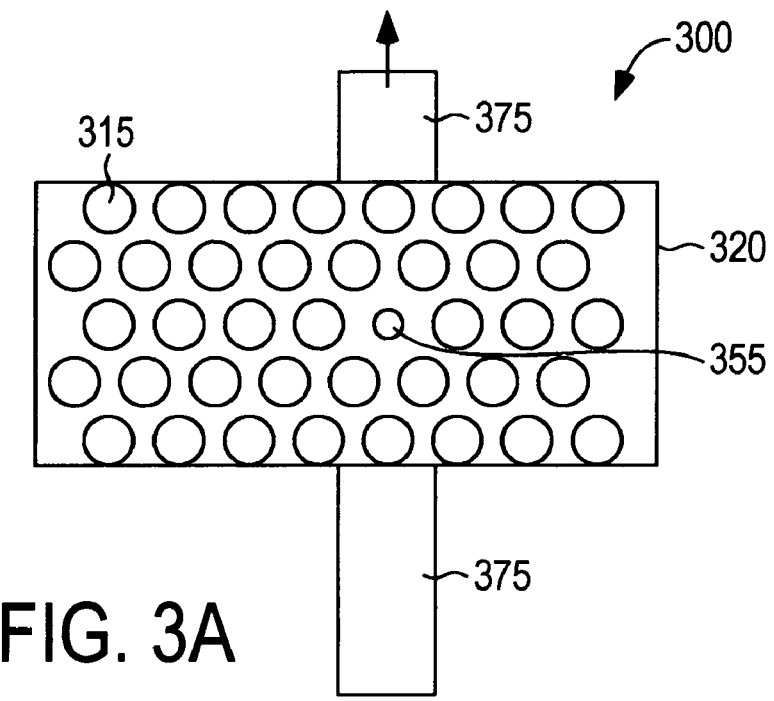
FIG. 3a shows an embodiment in accordance with the invention.

FIG. 3a shows photonic crystal sensor 300 where holes 315 have a radius of about 0.29a in an embodiment in accordance with the invention or in an alternative embodiment in accordance with the invention, a radius of about 0.36a where a is the lattice spacing. Hole 355 has a radius of about 0.17a when holes 315 have a radius of about 0.29a and a radius of about 0.21a when holes 315 have a radius of about 0.36a. For photonic crystal sensor 300 this results in $\Delta v/v_{air}$=0.044 for the sensitivity measure when holes 315 have a radius of about 0.29a and in $\Delta v/v_{air}$=0.065 for the sensitivity measure when holes 315 have a radius of about 0.36a.

Figure 3B:
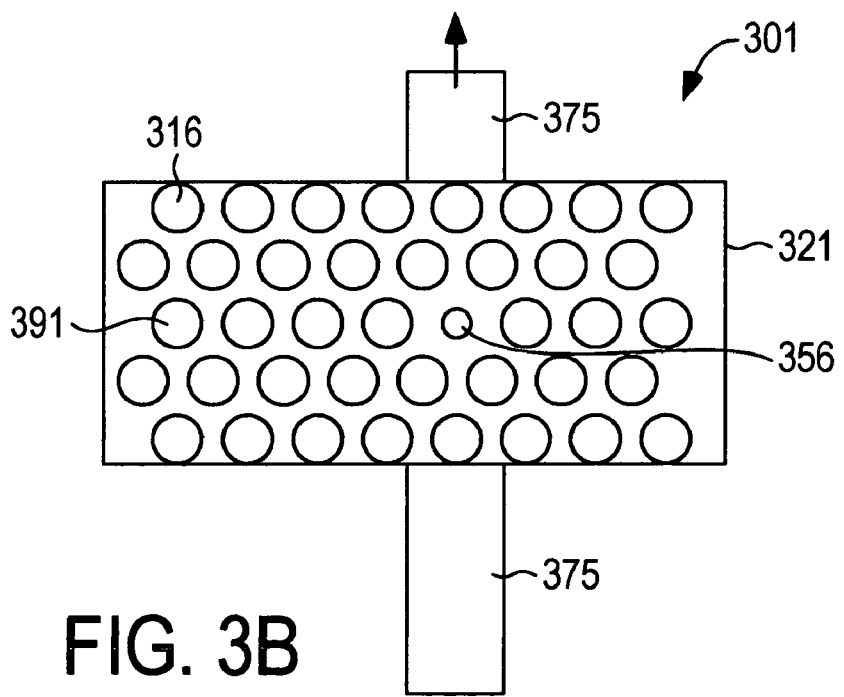
FIG. 3b shows an embodiment in accordance with the invention.

FIG. 3b shows photonic crystal sensor 301 where holes 316 have a radius of about 0.29a in an embodiment in accordance with the invention or in an alternative embodiment in accordance with the invention holes 316 have a radius of about 0.36a. Holes 391 of the middle layer and hole 356 are elongated in the propagation direction by about 0.125a which results in elliptical holes 391 having a major axis of about 0.705a or 0.845a corresponding to holes 316 having a radius of about 0.29a or 0.36a, respectively. Elliptical hole 356 has a major axis of about 0.465a when holes 316 have a radius of about 0.29a and a major axis of about 0.545 when holes 316 have a radius of about 0.36a. For photonic crystal sensor 310 this results in $\Delta v/v_{air}$=0.038 for the sensitivity measure when holes 316 have a radius of about 0.29a and in $\Delta v/v_{air}$=0.056 when holes 316 have a radius of about 0.36a.

Figure 3C:
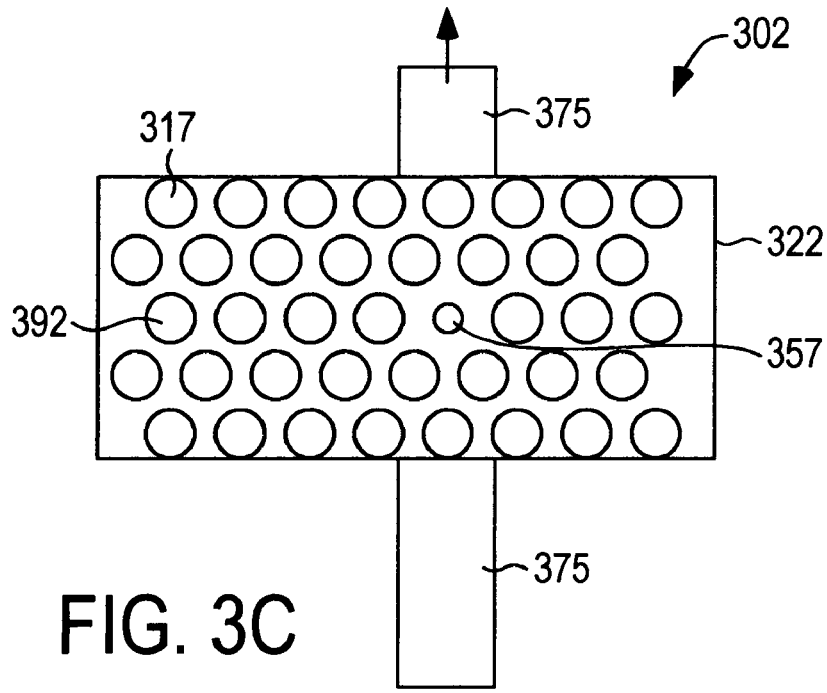
FIG. 3c shows an embodiment in accordance with the invention.

FIG. 3c shows photonic crystal sensor 302 where holes 317 have a radius of about 0.29a in an embodiment in accordance with the invention or in an alternative embodiment in accordance with the invention, holes 317 have a radius of about 0.36a. Holes 392 of the middle layer and hole 357 are elongated in the propagation direction by about 0.125a which results in elliptical holes 392 having a major axis of about 0.705a or 0.845a corresponding to holes 317 having a radius of about 0.29a or 0.36a, respectively. Elliptical hole 357 has a major axis of about 0.525a when holes 317 have a radius of about 0.29a and a major axis of about 0.625a when holes 317 have a radius of about 0.36a. For photonic crystal sensor 302 this results in $\Delta v/v_{air}$=0.044 for the sensitivity measure when holes 317 have a radius of about 0.29a and in $\Delta v/v_{air}$=0.063 when holes 317 have a radius of about 0.36a.

Figure 3D:
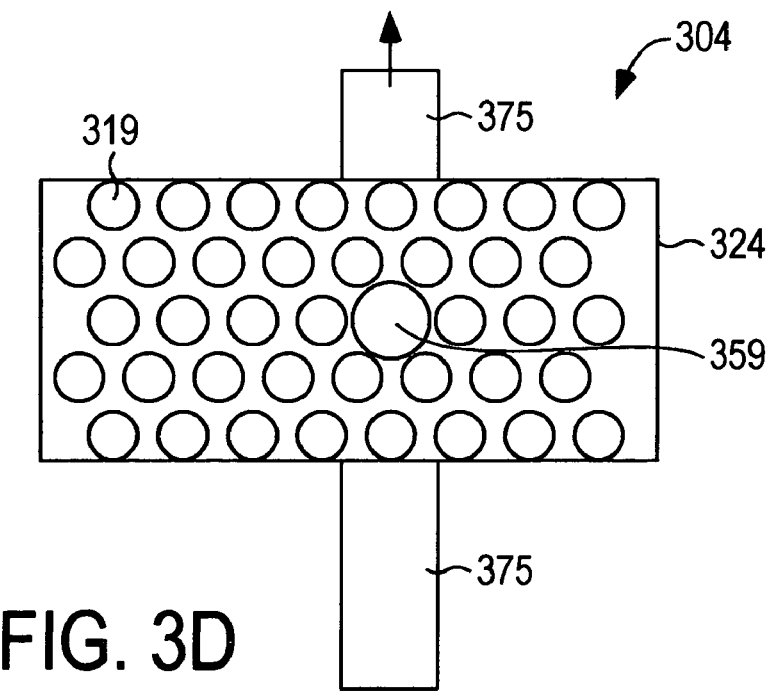
FIG. 3d shows an embodiment in accordance with the invention.

FIG. 3d shows photonic crystal sensor 304 where holes 319 have a radius of about 0.29a in an embodiment in accordance with the invention or in alternative embodiment in accordance with the invention, holes 319 have a radius of about 0.36a. Circular hole 359 has a radius of about 0.57a. For photonic crystal sensor 304 this results in $\Delta v/v_{air}$=0.045 for the sensitivity measure when holes 319 have a radius of about 0.29a and $\Delta v/v_{air}$=0.073 for the sensitivity measure when holes 319 have a radius of about 0.36a.

Figure 3E:
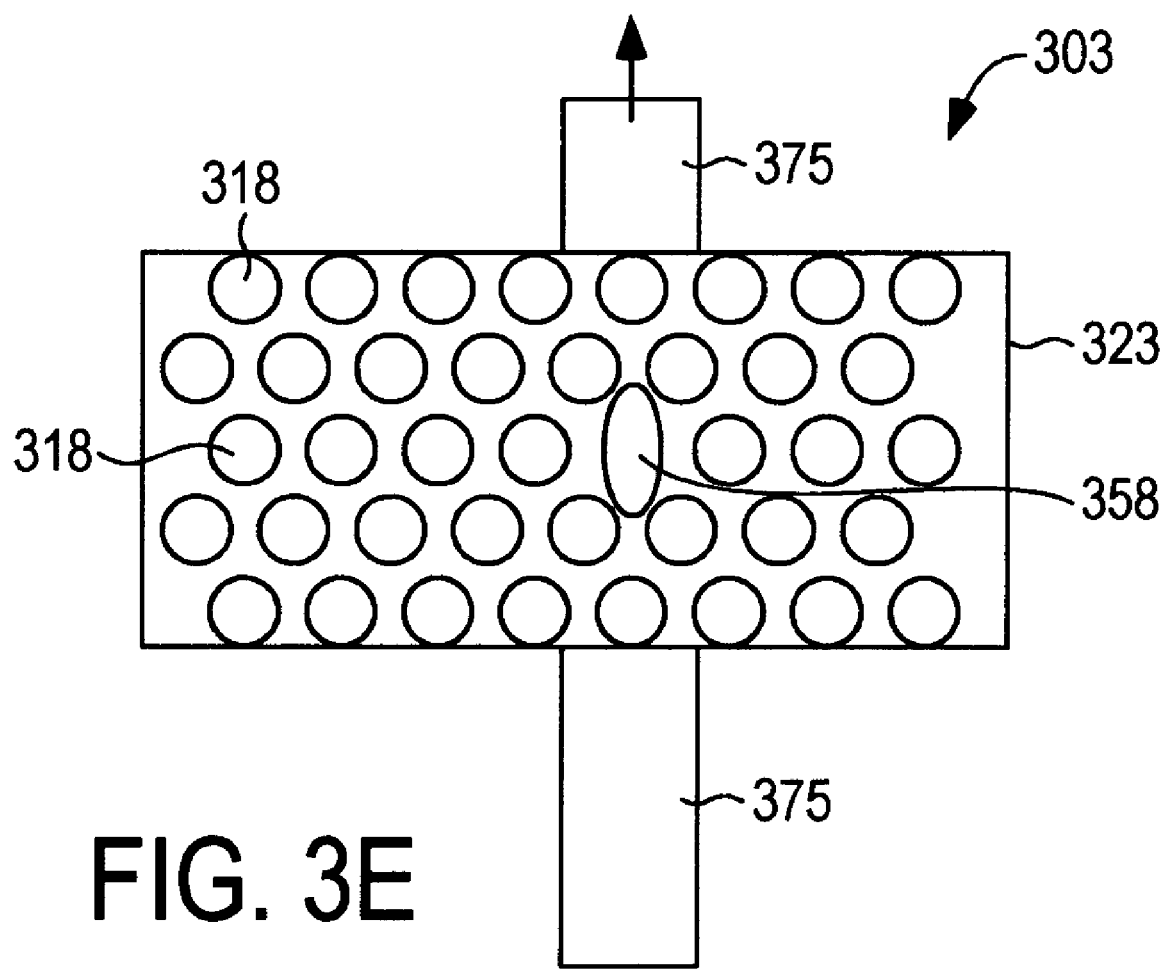
FIG. 3e shows an embodiment in accordance with the invention.

FIG. 3e shows photonic crystal sensor 303 where holes 318 have a radius of about 0.29a in an embodiment in accordance with the invention or in an alternative embodiment in accordance with the invention, holes 318 have a radius of about 0.36a. Elliptical hole 358 has a minor axis of about 0.66a and a major axis of about 1.48a. For photonic crystal sensor 303 this results in $\Delta v/v_{air}$=0.051 for the sensitivity measure when holes 318 have a radius of about 0.29a and in $\Delta v/v_{air}$=0.077 when holes 318 have a radius of about 0.36a. Hence, photonic crystal sensor 303 has the highest sensitivity to refractive index change but photonic crystal sensors 301 and 302 have higher Q factors due to greater localization of the optical field in the high refractive index material which acts to reduce sensitivity.

Transmission for photonic crystal sensors 300-304 is lower for the case where holes 315, 316, 317, 318, 319 have a radius of about 0.36a compared to about 0.29a and is due to reduced coupling between conventional ridge waveguides 375 and high refractive index slabs 320, 321, 322, 323, 324. For example, photonic crystal sensor 303 has a transmission of 0.31 with holes 318 having a radius of about 0.29a compared to a transmission of 0.11 with holes 318 having a radius of about 0.36a. The average dielectric constant of high refractive index slabs 320, 321, 322, 323 is smaller when the radius of holes 315, 316, 317, 318, 319 is about 0.36a compared to about 0.29a. Hence, the refractive index discontinuity between high refractive index slabs 320, 321, 322, 323, 324 and conventional ridge waveguides 375 is increased leading to reduced coupling. Coupling may be improved by tapering conventional waveguides 375 as described above. Sensitivity may be enhanced by placing metal layers above and below high refractive index slabs 320, 321, 322, 323, 324 to increase optical confinement. Metals such as gold, silver or aluminum may be used as they are less absorbing. The thickness of metal layers is typically on the order of the lattice constant a or less. For details see U.S. Patent Publication No. 20020159126A1 incorporated by reference. Because the metal layers act to confine the light in the direction perpendicular to the two dimensional photonic crystal slab, materials other than Si such as $Al_2O_3$, GaN, SiN or $SiO_2$ may be used. This increases the sensitivity of the photonic crystal sensors such as photonic crystal sensor 303. However, the optical absorption (especially at visible and near infrared wavelengths) by metals typically decreases the transmission and Q factor for such photonic crystal sensors.

Figure 4A:
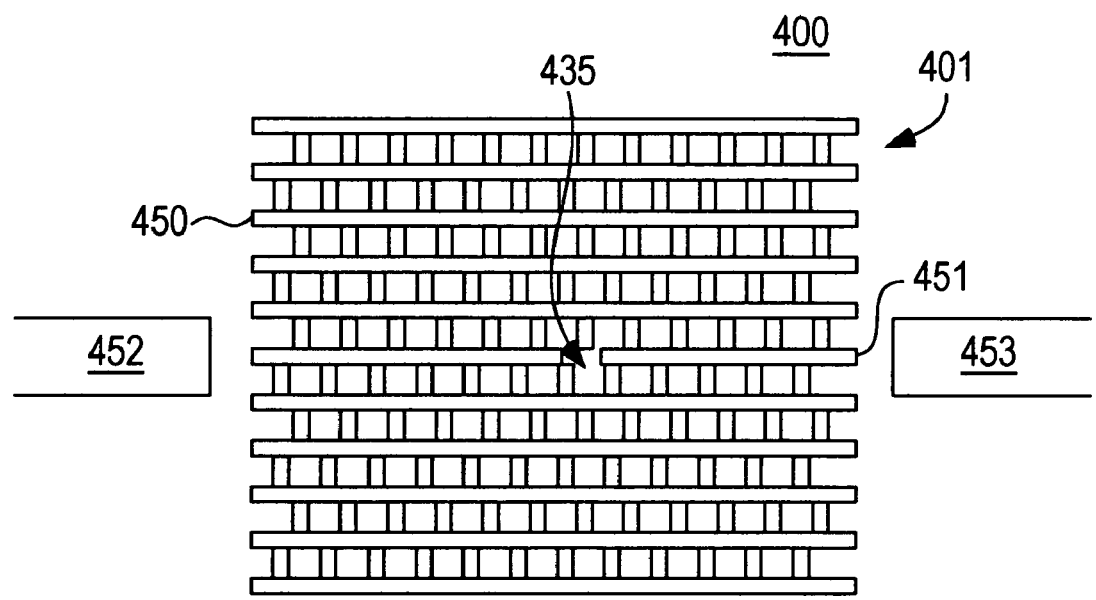
FIGS. 4a-b show an embodiment in accordance with the invention.
Figure 4B:
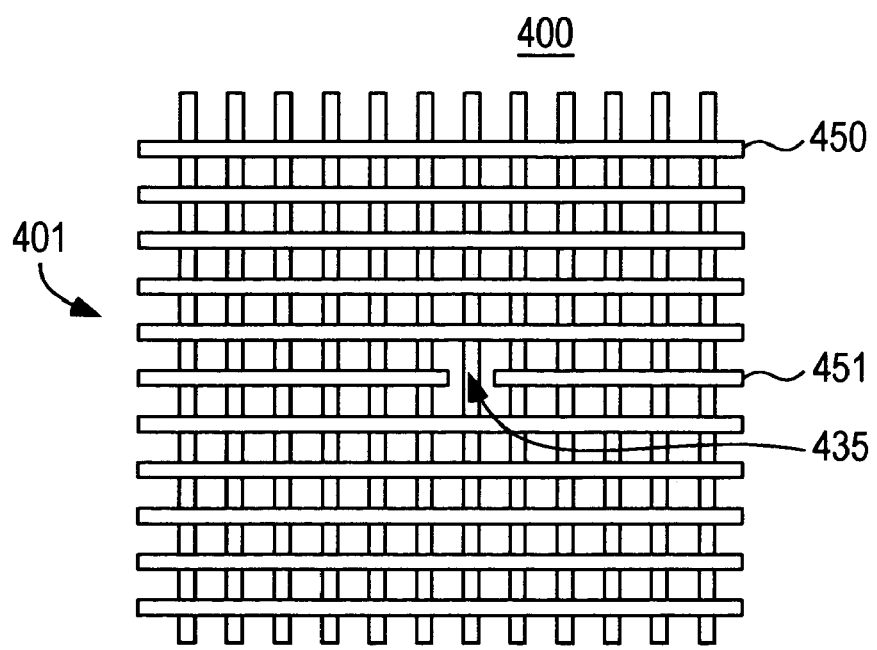

FIGS. 4a-4b show three dimensional photonic crystal sensor 400 in a side and top view, respectively, in accordance with the invention. Photonic crystal sensor 400 has 21 layers. Because photonic crystal sensor 400 is three dimensional, the peak in transmission due to defect region 435 appears for any incident angle of light. Hence, light may be coupled into photonic crystal sensor 400 from one side and outcoupled on the opposite side at the operating wavelength using, for example, conventional ridge waveguides 452 and 453, respectively. If light is to be coupled in perpendicular to the layers of three dimensional photonic crystal lattice 401 optical fiber waveguides are typically used. Three dimensional photonic crystal sensor 400 provides better sensitivity than photonic crystal sensors 300, 301, 302, 303, 304 but is typically more difficult to make. In an embodiment in accordance with the invention, three dimensional photonic crystal sensor 400 is constructed from layers of dielectric rods 450 having a refractive index of about 3.6 to form three dimensional photonic crystal lattice 401 and is typically Si, GaAs or InP. Dielectric rods 450, for example, have cross-sectional dimensions of about 0.22c by 0.25c where c is the thickness of one unit cell along the stacking direction and is equal to the thickness of four dielectric rods 450. Dielectric rods 450 are separated from each other by about 0.6875a within each layer. Defect region 435 is created by removing about 0.625a of the middle portion of rod 451. The sensitivity measure for photonic crystal sensor 400, $\Delta v/v_{air}=0.112$.

In practice, the sensing volume that lies in defect region 435 of photonic crystal sensor 400 is lithographically defined. Because the optical field or light is localized in defect region 435, it is important to only have the volume around defect available for filling with the analyte. Replacement of the air with, for example, $SiO_2$ simplifies operation and fabrication while maintaining the performance of photonic crystal sensor 400, see Fleming, J. G. and Lin, S. Y. in Journal of Lightwave Technology, v17(11), p. 1956-1962, 1999, incorporated by reference. After completion of the three-dimensional layers of photonic crystal sensor 400, an opening in the photoresist is registered to defect region 435 of photonic crystal sensor 400. The use of a hydrofluoric acid etch or other selective etch that etches $SiO_2$ allows the removal of $SiO_2$ in the sensing volume. This enables the controlled flow of analyte into a small, well defined volume of photonic crystal 400 and requires less analyte.

Figure 5A:
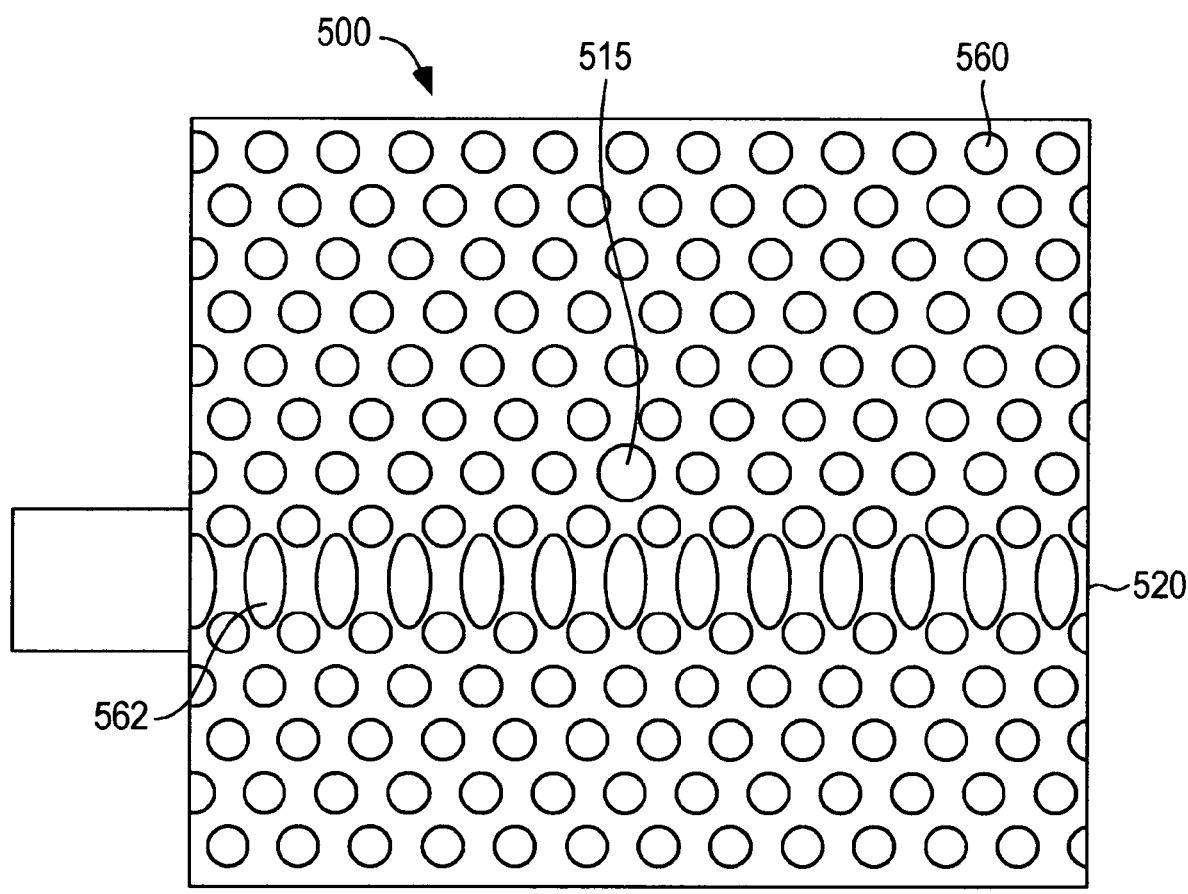
FIG. 5a shows an embodiment in accordance with the invention.
Figure 5B:
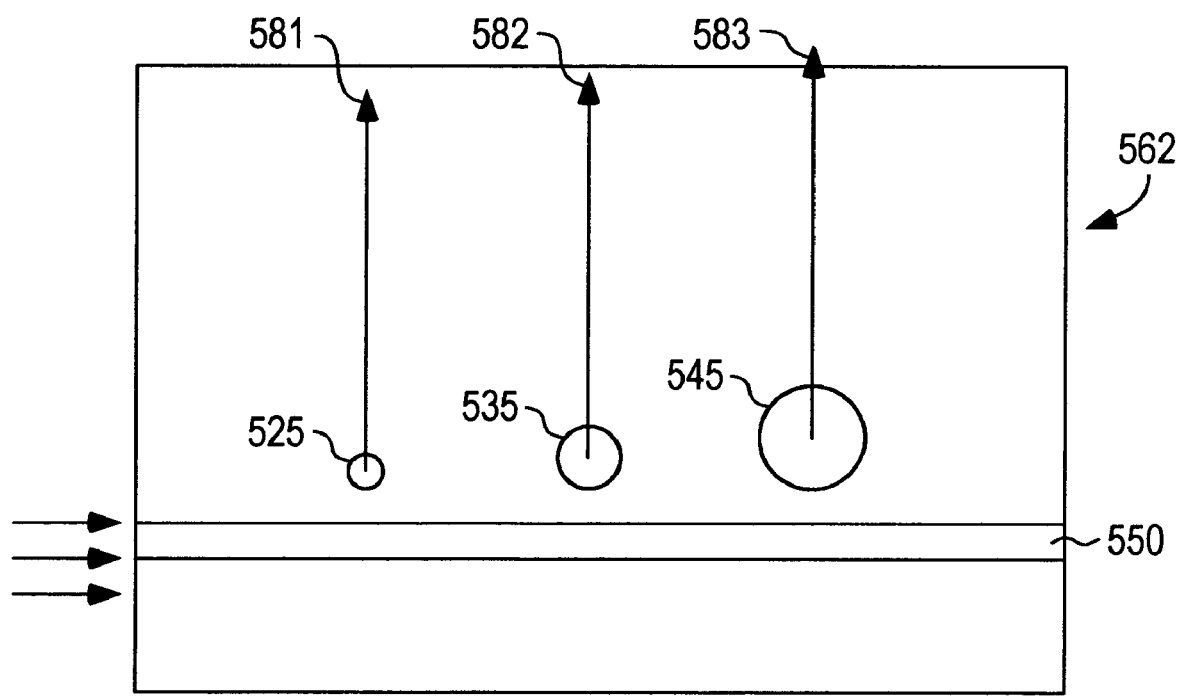
FIG. 5b shows a simplified view of an embodiment in accordance with the invention.

In accordance with embodiments of the invention, two dimensional photonic crystal sensors may be arranged in photonic crystal configuration 500 as shown in FIG. 5a to allow addressing of multiple defect holes as shown in FIG. 5b. Defect hole 515 can couple light out of photonic crystal waveguide 520. At the operating wavelength of defect hole 515, transmission along photonic crystal waveguide 520 drops as light is coupled out of photonic crystal waveguide 520 and a peak occurs for power passing out of the top of the plane of photonic crystal configuration 500. Changing the size and/or shape of defect hole 515 changes the operating wavelength. A series of defect holes 525, 535, 545 may be arranged along the length of photonic crystal waveguide 550 as shown in a conceptual view in FIG. 5b. Signal peaks 581, 582, 583 occur for signal leakage out of the plane of photonic crystal waveguide 575 at the different operating wavelengths of defect holes 525, 535, 545 as a tunable optical source (not shown) sweeps across a waveband. Signal peaks 581, 582, 583 (see FIG. 5b) are typically measured using photodetectors (not shown) positioned above defect holes 525, 535, 545, respectively. Microlenses (not shown) are typically used to focus the signal onto each photodetector.

Figure 5C:
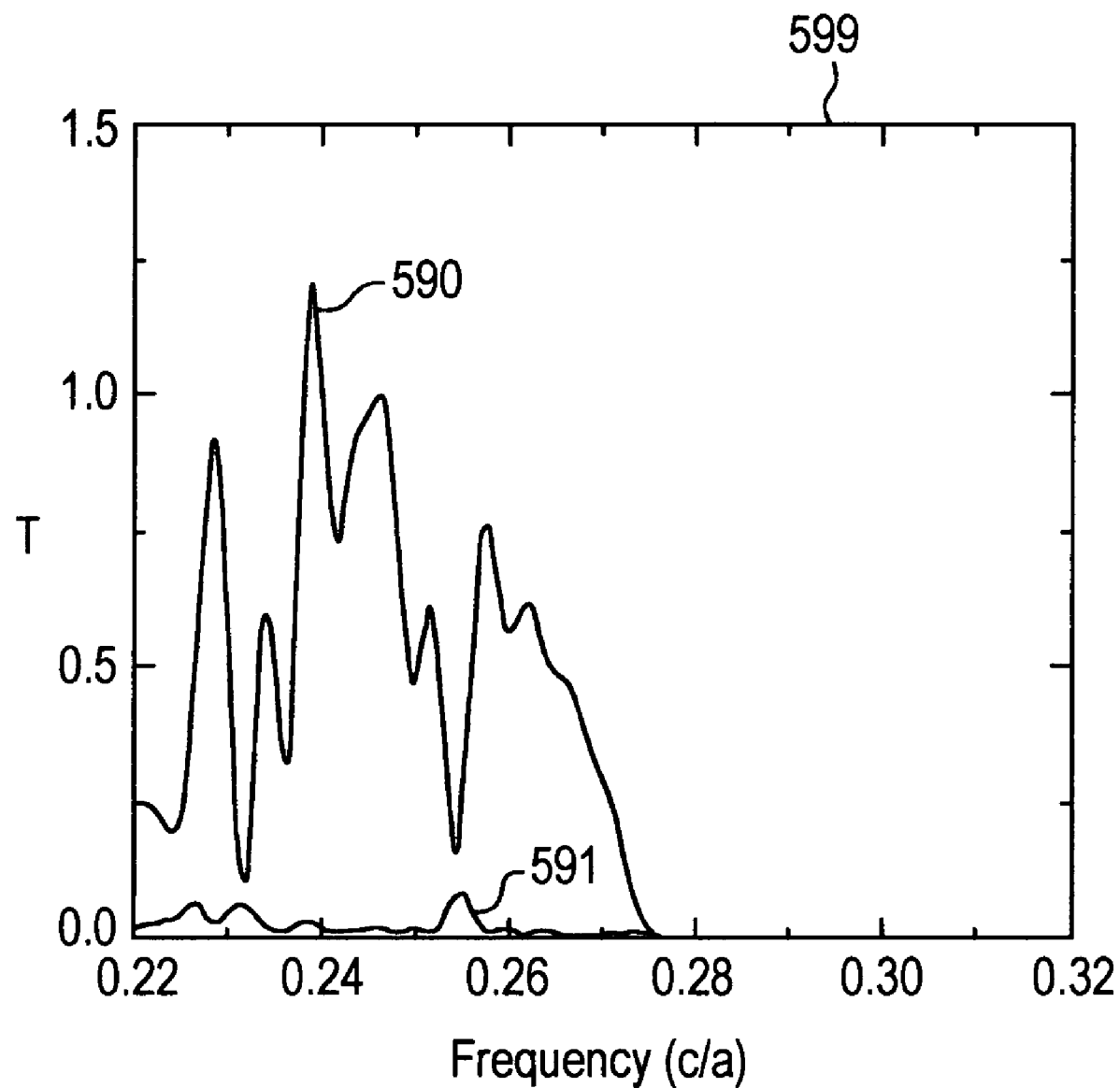
FIG. 5c show transmission versus frequency for the embodiment in FIG. 5 and the optical signal leaked out of the top of the plane of photonic crystal configuration.

With respect to FIG. 5a, for example, in an embodiment in accordance with the invention, holes 560 of photonic crystal configuration 500 have a radius of about 0.29a where a is the lattice constant and a depth of 0.6a in silicon slab 561 which is disposed on an $SiO_2$ substrate. One row of holes 560 is replaced by elliptical holes 562 having a minor axis of about 0.66a and a major axis of about 1.48a. Defect hole 515 has a radius of about 0.41a. FIG. 5c shows graph 599 of transmission versus frequency along photonic crystal waveguide 520 and the optical signal leaked out of the top of the plane of photonic crystal configuration 500. At the operating frequency of defect hole 515, 0.254c/a where c is the speed of light in vacuum, there is an about 8 dB drop in the transmission along photonic crystal waveguide 520 indicated by line 590 and a peak in power leaking out of the plane indicated by line 591. About 8% of the leakage is into the $SiO_2$ substrate below and about 7% of the leakage is up out of the plane into the air.

With respect to FIG. 5b, the ordering of defect holes 525, 535, 545 is typically arranged such that the defect holes that couple more strongly to photonic crystal waveguide 520 are positioned further down photonic crystal waveguide 520 where the transmitted signal is weaker. This is because output efficiency depends on the ratio of the in-plane quality factor and perpendicular to the plane quality factor. The output efficiency is maximum when the ratio is unity. The quality factors depend on both the shape and size of defect holes 525, 535, 545, the separation between defect holes 525, 535, 545 and photonic crystal waveguide 550, the thickness of photonic crystal slab 562 and the refractive indices of photonic crystal slab 562 and the substrate (not shown in FIG. 5b). Because photonic crystal waveguide 550 is lossy, those defect holes of defect holes 525, 535, 545 with low output efficiency are positioned near the input to photonic crystal waveguide 550 and those defect holes of defect holes 525, 535, 545 with high output efficiency are positioned near the end of photonic crystal waveguide 550. Details regarding the output efficiency may be found in M. Imada et al, Journal of Lightwave Technology 20, 873, 2002 which is hereby incorporated by reference.

Figure 6A:
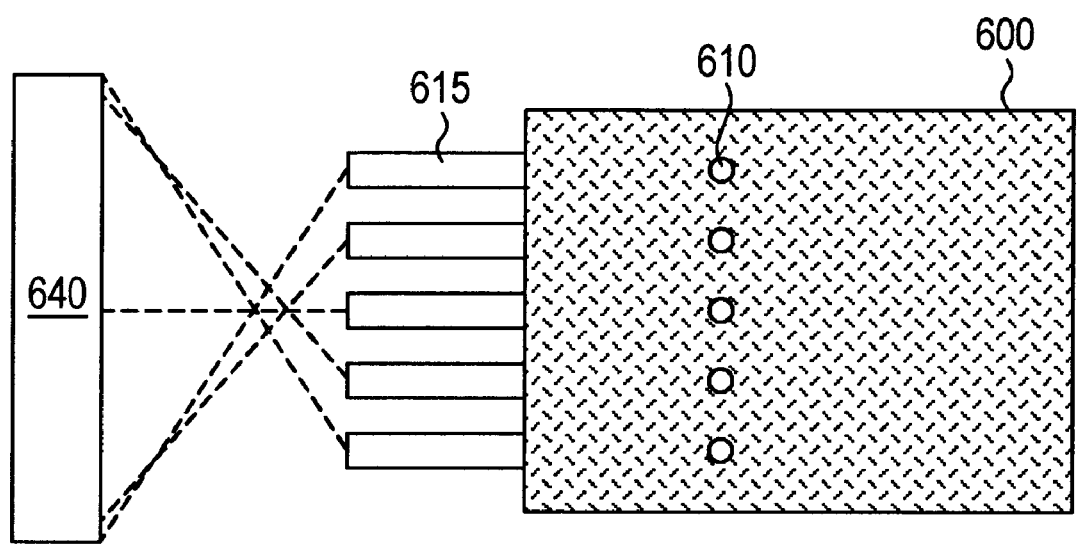
FIG. 6a shows an embodiment in accordance with the invention.

In accordance with an embodiment of the invention, an array of photonic crystal sensors 610 may be arranged on sensor chip 600 as shown in simplified form in FIG. 6a. An array of waveguides 615 can be brought to the edge of sensor chip 600, one waveguide 615 for each photonic crystal sensor 610. The pitch for array of waveguides 615 is typically about 4 µm. The focal length of a high NA focusing lens in accordance with the invention is typically 1 mm and the aperture of the focusing lens is typically 0.5 mm. The number of waveguides 615 that are addressable in the array is effectively limited by how large an angle of incidence can be achieved while maintaining an adequate transmittance into waveguides 615 (see FIGS. 2a and 2b) for a fixed input power.

Figure 6B:
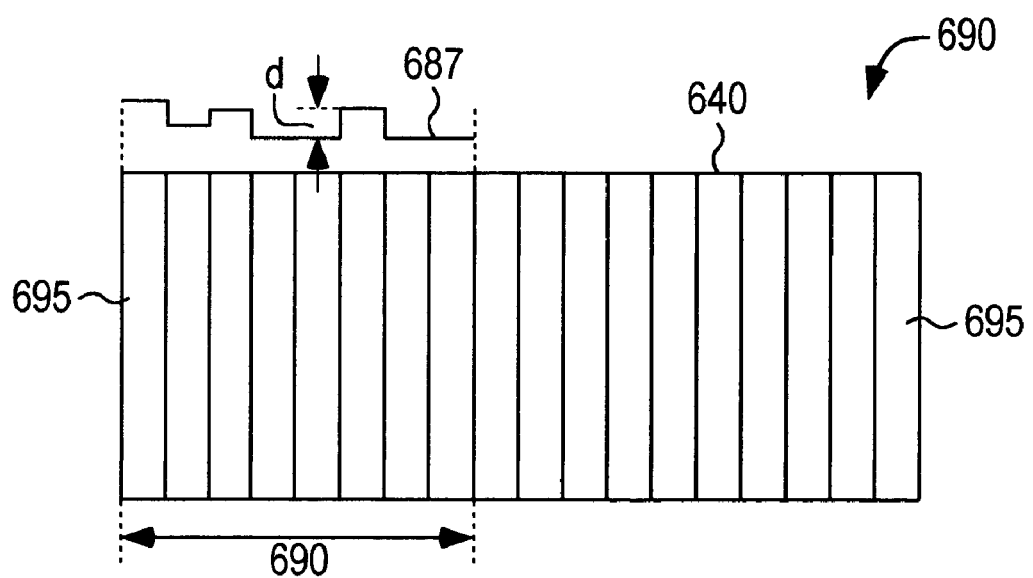
FIG. 6b shows an embodiment of a diffractive supercell in accordance with the invention.

Array of photonic crystal sensors 610 may be addressed using diffractive array generator 640 to address or couple into array of waveguides 615 simultaneously. Diffractive array generators such as diffractive array generator 640 are described in, for example, Gmitro, A. F. and Coleman, C. L., Optoelectronic Interconnects and Packaging, Proceeding SPIE, v. CR62, 88, 1996 which is incorporated herein by reference. Commercially available diffractive array generators generate 20 diffractive orders and are about 95% efficient. Diffractive array generator 640 is designed to provide a predetermined angular separation between neighboring diffraction orders or beamlets. For example, if the focal length is about 1 mm and the pitch of array of waveguides 615 is 4 μm, the required angular separation is 0.004 radians. Diffractive array generator 640 is typically divided into diffractive supercells 690. The angular separation determines the size of diffractive supercell 690 (see FIG. 6b) which is determined by $\lambda/\sin\theta$ where $\lambda$ is the wavelength of the light and $\theta$ is the angular separation. For $\theta=0.004$ and $\lambda=1500$ nm, the size of diffractive supercell 690 is about 375 μm. Diffractive supercell 690 is typically divided into a number of pixels 695 where each pixel 695 imparts a phase delay. The phase delay created by each pixel 695 is determined by etching into surface 687 of diffractive supercell 690 a depth d, so that the phase delay is given by $(n_1-n_2)2d\pi/\lambda$ where $n_1$ is the refractive index of diffractive supercell 690, $n_2$ is the refractive index of the surrounding medium and $\lambda$ is the optical wavelength.

The larger the number of pixels 695, the more diffraction orders can be addressed and the better the uniformity of the power across the diffractive orders will be. Taking pixels 695 to have a size of about 1 μm and diffractive supercell 690 to have a size of 375 μm allows diffraction of light into about 100 orders with intensity of each order being equal to within about 20%.

The effect of a tunable optical source needs to be considered as the wavelength is changed. For example, given a tuning range of about 10 nm with a center wavelength of 1500 nm for the tunable optical source, the $50^{th}$ diffractive order is diffracted at an angle of about 11.57 degrees at 1500 nm and the $50^{th}$ diffractive order is diffracted at an angle of about 11.62 degrees at 1510 nm. The lateral displacement of the diffraction order is then about 200 μm at 1500 nm and about 201 μm at 1510 nm. While coupling efficiency is reduced, a significant portion is still coupled into waveguide 615 over the 10 nm tuning range of the tunable optical source. A 10 nm tuning range is typically adequate to cover the entire dynamic range of photonic crystal sensors 610 for detecting biomolecule adhesion to photonic crystal sensors 610 in the presence of water. To obtain a wider tuning range, it is typically necessary to reduce the number of diffraction orders and therefore, the number of addressable waveguides 615. Static diffractive elements for diffractive array generator 640 are typically made from dielectric materials such as quartz or polymers such as polymethylmethacrylate or polycarbonate.

Alternatives to diffractive array generators include spatial light modulators (SLM) that can be used as dynamically reconfigurable diffractive array generators, see, for example, Kirk, A. et al. in Optical Communications, vol. 105, 302-308, 1994, and MEMs based dynamically reconfigurable mirror arrays, see, for example, Yamamoto, T et al. in IEEE Photonics Technology Letters, 1360-1362, 2003. SLMs typically allow individual addressing of each of waveguides 615 sequentially in time.

Figure 7:
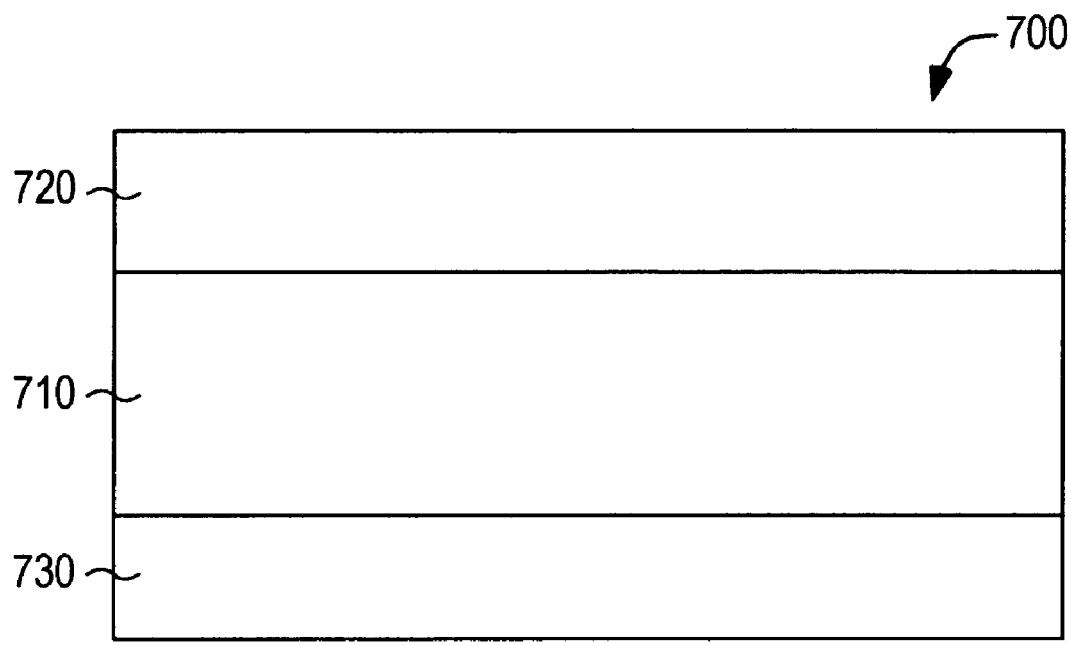
FIG. 7 shows an embodiment in accordance with the invention using a materials stack.

FIG. 7 shows an embodiment in accordance with the invention using materials stack 700. High refractive index core layer 710 with refractive index in the range from 3 to 4, such as Si or Ge single crystalline material or such as GaAs or InP compound semiconductor material, is surrounded by cladding layers 720 and 730. Cladding layers 720 and 730 are typically made from materials having a refractive index of about 1.5 such as $SiO_2$, $Al_2O_3$ or spin on glass. When using Si single crystalline material, top and bottom cladding layers 720 and 730 are typically formed from material having a refractive index of about 1.5 such as $SiO_2$ or spin on glass. When using compound semiconductor material such as III-V material, bottom cladding layer 720 is typically $Al_2O_3$ (refractive index of about 1.76) due to the ease with which epitaxial layers with aluminum containing compounds may be formed. The aluminum layer is later oxidized using lateral oxidation. If light is to be coupled out of the plane of materials stack 200, upper cladding layer 730 typically has a higher refractive index than lower cladding layer 720 and may be made from $SiO_2$, $Si_3N_4$ or other suitable material with a refractive index less than 2.

Typical starting structures for two dimensional photonic crystal sensors in accordance with the invention are silicon on insulator (SOI) wafers, GaAs/$Al_xO_y$ or InGaAsP/$Al_xO_y$ materials. Two dimensional photonic crystal sensors may be realized, for example, in GaAs/$Al_xO_y$ or InGaAsP/$Al_xO_y$ materials by using wet oxidation technology developed for vertical cavity surface emitting lasers (VCSELs) and in small refractive index contrast materials such as InGaAsP/InP or GaAs/AlGaAs based materials which require deep etching while preserving vertical sidewalls to reduce propagation losses.

Figure 8A:
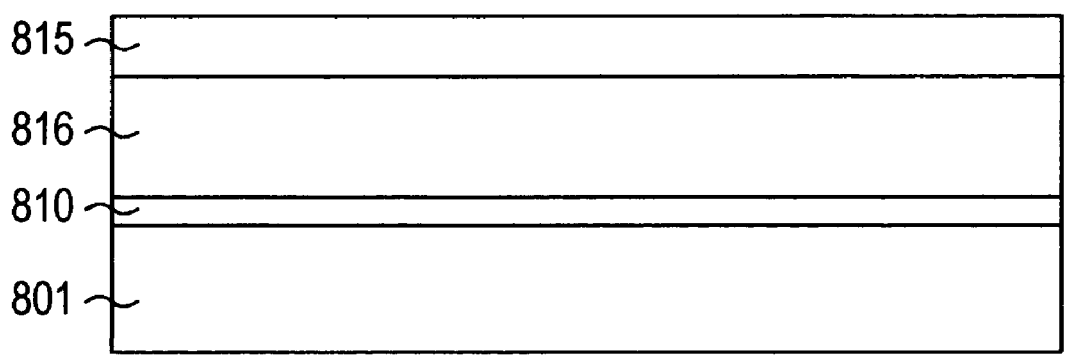
FIGS. 8a-c shows steps for making an embodiment in accordance with the invention.

In accordance with an embodiment of the invention and with reference to FIG. 8a, two dimensional photonic crystal sensors are fabricated from SOI wafers with Si slab 801 having a thickness of about 260 nm separated from Si substrate 816 by $SiO_2$ layer 810 having a thickness of about 1 μm. FIG. 8a shows 100 nm thick $SiO_2$ hard mask 815 deposited on SOI wafer 810 using low temperature plasma assisted chemical vapor deposition. The thickness of Si slab 816 is selected to provide a large photonic bandgap as described by Johnson, S. G., et al. in Physics Review B, vol. 60, 8, p. 5751, 1999. Thicknesses for Si slab 816 that are greater than about 260 nm are found using the effective index method to result in multimode waveguides. Use of different cladding layers adjusts the thickness of Si slab 816 accordingly.

Figure 8B:
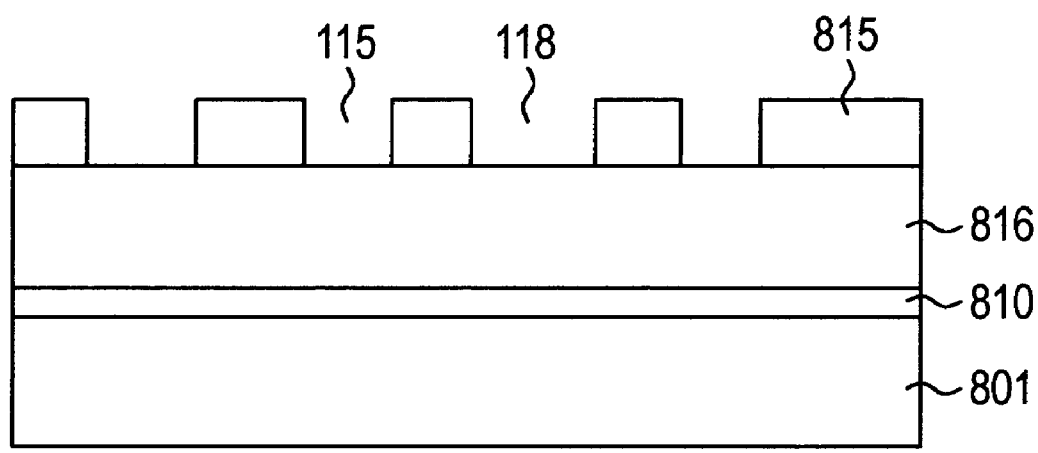
Figure 8C:
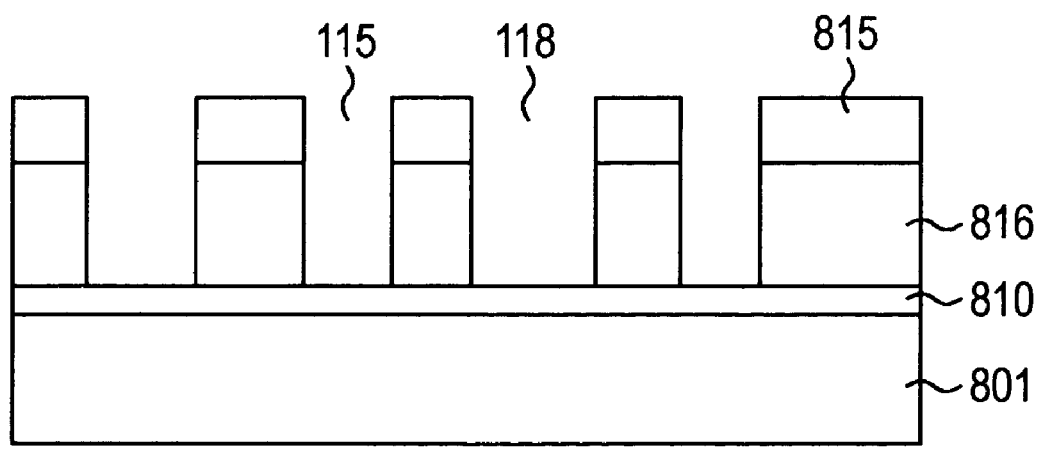

Photonic crystal lattice structure 110 and ridge waveguides 175 (see FIG. 1) are patterned in a single lithography step using an e-beam lithography tool. Photonic crystal lattice structure 110 is typically defined in high resolution mode on about a 5 nm grid and ridge waveguides 175 are typically defined on a coarser grid of about 50 nm. Alignment between photonic crystal lattice structure 110 and ridge waveguides 175 is maintained by referencing both photonic crystal lattice structure 110 and ridge waveguides 175 to metal alignment marks (not shown) created in a prior lithographic step. Hole 118 is typically surrounded by 2 to 4 lattice periods perpendicular to the direction of propagation in ride waveguides 175. The e-beam lithography pattern is typically transferred into $SiO_2$ hard mask 815 (see FIG. 8b) with a reactive ion etch (RIE) using a $CHF_3/He/O_2$ chemistry. Etching of Si slab 816 (see FIG. 8c) is performed using an HBr chemistry to create highly vertical and smooth sidewalls, see Painter et al., Journal of Lightwave Technology, 17 (11) p. 2082, 1999, incorporated herein by reference. To obtain good quality facets on photonic crystal lattice structure 110, top surface 145 of photonic crystal lattice structure 110 is protected by a thermally stable organic medium (typically photoresist) that can be easily removed following deposition when photonic crystal lattice structure 110 is diced and polished. Polishing is typically carried out using a SYTON®, colloidal silica polish.

Appropriate sizes for defect hole 118 and holes 115 are achieved by balancing the layout geometry considerations with the electron beam dose. In dose definition experiments for nanoscale features, proximity effects must be considered. Doses are correlated with the final hole dimension after both the $SiO_2$ and Si etch processes. The final dimensions of holes 115 and defect hole 118 are typically smaller than the features as defined by e-beam lithography indicating that the etch processes typically yield sidewalls less than vertical.

The particular etch process used to transfer patterns into $SiO_2$ layer 815 has an effect on the diameter of holes 115 and defect hole 118. Holes 115 and defect hole 118 may either increase or decrease in diameter depending on the particular etch conditions. Lower reactor pressures during the etch process result in a smaller change in the diameter from design dimensions to final dimensions of holes 115 and defect hole 118. Typical fabrication tolerances are less than 2% from the initial lithography pattern to photonic crystal lattice structure 110. Underlying $SiO_2$ layer 810 is retained to provide additional mechanical support.

The invention claimed is:

1. A two dimensional photonic crystal sensor apparatus comprising:
   a waveguide for inputting light; and
   a photonic crystal slab comprising: a two dimensional periodic lattice of holes, said two dimensional periodic lattice of holes comprising: a first nearest neighbor direction and a second nearest neighbor direction; a lattice constant; and a defect hole, said photonic crystal slab configured to couple said light from said waveguide along said second nearest neighbor direction and configured to confine said light in said defect hole at an operating wavelength, wherein a coupling efficiency of said light along said second nearest neighbor direction is greater than a coupling efficiency along said first nearest neighbor direction.

2. The apparatus of claim 1 wherein said defect hole has a larger volume than said holes.

3. The apparatus of claim 1 wherein said defect hole has a smaller volume than said holes.

4. The apparatus of claim 1 wherein said photonic crystal slab is comprised of silicon.

5. The apparatus of claim 1 wherein said two dimensional periodic lattice is a triangular lattice.

6. The apparatus of claim 1 wherein said defect hole has a substantially elliptical cross-section.

7. The apparatus of claim 1 wherein said photonic crystal sensor is operable to outcouple light from said photonic crystal slab in a direction perpendicular to said photonic crystal slab.

8. The apparatus of claim 1 further comprising a tunable optical source coupled top said waveguide.

9. The apparatus of claim 1 wherein said waveguide is a conventional ridge waveguide.

10. The apparatus of claim 1 wherein an operating wavelength of said photonic crystal sensor is determined by a dither system.

11. The apparatus of claim 1 wherein an operating wavelength of said photonic crystal sensor is determined by a synchronized scanning system.

12. The apparatus of claim 1 wherein an operating wavelength of said photonic crystal sensor is determined by a using system of multiple light emitting diodes.

13. The apparatus of claim 1 wherein an operating wavelength of said photonic crystal sensor is determined by using a slope based detection system.

14. The apparatus of claim 1 wherein a photodetector is positioned out of the plane of said photonic crystal slab to be operable to detect said light at an operational wavelength of said photonic crystal sensor.

15. A two dimensional photonic crystal sensor apparatus comprising:
   a photonic crystal slab comprising: a two dimensional periodic lattice of holes comprising: a lattice constant; a plurality of defect holes; and a first nearest neighbor direction and a second nearest neighbor direction, said photonic crystal slab configured to confine light at a plurality of operating wavelengths to said plurality of defect holes; and
   a substantially straight line of defects defining a waveguide in said two dimensional periodic lattice of holes, said waveguide optically coupling said light to said plurality of defect holes along said second nearest neighbor direction, wherein a coupling efficiency of said light along said second nearest neighbor direction is greater than a coupling efficiency along said first nearest neighbor direction.

16. The apparatus of claim 14 said plurality of defect holes do not all have the same volume.

17. The apparatus of claim 14 wherein said plurality of defect holes are arranged in an order to maximize the optical coupling of said waveguide to said plurality of defect holes.

18. A two dimensional photonic crystal sensor apparatus comprising:
   a plurality of input waveguides; and
   a photonic crystal slab optically coupled to each of said plurality of waveguides, said photonic crystal slab comprising a two dimensional periodic lattice of holes with a lattice constant and a plurality of defect holes said two dimensional periodic lattice of holes comprising a first nearest neighbor direction and a second nearest neighbor direction said photonic crystal slab configured to couple light from said plurality of waveguides along said second nearest neighbor direction and operable to confine said light at a plurality of operating wavelengths in said plurality of defect holes, wherein a coupling efficiency of said light along said second nearest neighbor direction is greater than a coupling efficiency along said first nearest neighbor direction.

19. The apparatus of claim 17 wherein said plurality of input waveguides is optically addressed using a diffractive array generator.

20. The apparatus of claim 17 wherein said plurality of input waveguides is optically addressed using a dynamically reconfigurable diffractive array generator.

21. The apparatus of claim 17 wherein said plurality of input waveguides is optically addressed using a MEMs based dynamically reconfigurable mirror array.

22. A three dimensional photonic crystal sensor comprising:
   an input waveguide; and
   a three dimensional photonic crystal lattice structure optically coupled to said waveguide, said three dimensional photonic crystal lattice structure comprising: a defect region, a first nearest neighbor direction and a second nearest neighbor direction, said three dimensional photonic crystal lattice structure configured to couple light from said input waveguide along said second nearest neighbor direction and configured to confine said light at an operating wavelength in said defect region, wherein a coupling efficiency of said light along said second nearest neighbor direction is greater than a coupling efficiency along said first nearest neighbor direction.

23. The apparatus of claim 22 further comprising an output waveguide operable for outcoupling said light at said operating wavelength from said three dimensional photonic crystal lattice structure.

24. A photonic crystal sensor apparatus comprising: a waveguide for inputting; and a photonic crystal structure comprising a lattice, a first nearest neighbor direction and a second nearest neighbor direction and being optically coupled to said waveguide along said second nearest neighbor direction, said lattice comprising a lattice constant and a lattice defect, said photonic crystal structure configured to receive light from said waveguide and configured to confine said light in said lattice defect at an operating wavelength, wherein a coupling efficiency of said light along said second nearest neighbor direction is greater than a coupling efficiency along said first nearest neighbor direction.

* * * * *